US012701400B2

(12) United States Patent
Song et al.

(10) Patent No.: US 12,701,400 B2
(45) Date of Patent: Aug. 4, 2026

(54) ELECTRONIC DEVICE AND METHOD FOR OVERLOAD CONTROL

(71) Applicant: SAMSUNG ELECTRONICS CO., LTD., Suwon-si (KR)

(72) Inventors: Junhyuk Song, Suwon-si (KR); Seungwon Kang, Suwon-si (KR); Youngsung Kho, Suwon-si (KR); Chulmin Kim, Suwon-si (KR); Chungkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 299 days.

(21) Appl. No.: 18/628,511

(22) Filed: Apr. 5, 2024

(65) Prior Publication Data

US 2024/0276205 A1      Aug. 15, 2024

Related U.S. Application Data

(63) Continuation of application No. PCT/KR2024/001970, filed on Feb. 8, 2024.

(30) Foreign Application Priority Data

Feb. 13, 2023      (KR) ........................ 10-2023-0019044

(51) Int. Cl.
*H04L 12/00*          (2006.01)
*H04L 43/0882*      (2022.01)
(Continued)

(52) U.S. Cl.
CPC ........... *H04W 8/20* (2013.01); *H04L 43/0882* (2013.01); *H04W 8/183* (2013.01)

(58) Field of Classification Search
CPC ......... H04W 8/20; H04W 8/18; H04W 28/02; H04W 28/08; H04W 76/30; H04W 88/08; H04W 92/12; H04L 43/0882
(Continued)

(56) References Cited

U.S. PATENT DOCUMENTS 11,171,706 B2     11/2021  Du
2022/0225364 A1*    7/2022  Aiba ...................... H04W 72/20
(Continued)

FOREIGN PATENT DOCUMENTS

CN          114401531 A        4/2022
CN          115004797 A   *    9/2022   .............. H04W 8/00
(Continued)

OTHER PUBLICATIONS

International Search Report (PCT/ISA/210) issued May 27, 2024 by the International Searching Authority in the International Patent Application No. PCT/KR2024/001970.
(Continued)

*Primary Examiner* — Frantz Coby
(74) *Attorney, Agent, or Firm* — Sughrue Mion, PLLC

(57) ABSTRACT

The present disclosure relates to a 5th generation (5G) or 6th generation (6G) communication system to support higher data transmission rates after a 4th generation (4G) communication system such as long term evolution (LTE). According to embodiments, a method performed by a E2 node is provided. The method comprises receiving, from a near-real time (Near-RT) radio access network (RAN) intelligent controller (RIC), a first message for indicating that load status of the Near-RT RIC is overloaded, waiting for signaling on E2 interface until receiving a second message indicating that the load status of the Near-RT RIC is not overloaded, based on the first message, receiving, from the Near-RT RIC, the second message, and performing the
(Continued)

signaling on the E2 interface after receiving the second message.

22 Claims, 20 Drawing Sheets

(51) Int. Cl.
*H04W 8/18* (2009.01)
*H04W 8/20* (2009.01)
(58) Field of Classification Search
USPC ........................................................ 370/329
See application file for complete search history.

(56) References Cited

U.S. PATENT DOCUMENTS

| | | | | |
|---|---|---|---|---|
| 2023/0088205 A1* | 3/2023 | Lourdu Raja | ....... | H04W 52/241 |
| | | | | 370/329 |
| 2023/0110771 A1* | 4/2023 | Chung | ................. | H04W 28/02 |
| | | | | 370/329 |
| 2023/0239710 A1 | 7/2023 | Song et al. | | |
| 2023/0262499 A1* | 8/2023 | Zhang | ................ | H04W 88/085 |
| | | | | 370/329 |
| 2024/0121049 A1* | 4/2024 | Jeong | ................... | H04L 5/0048 |
| 2024/0357479 A1 | 10/2024 | Bhaskaran | | |

FOREIGN PATENT DOCUMENTS

| | | | | | | |
|---|---|---|---|---|---|---|
| CN | 114788365 B | * | 8/2024 | ........... | H04W 92/24 |
| CN | 114731605 B | * | 2/2025 | ............. | H04W 9/24 |
| EP | 4 255 103 A3 | | 11/2023 | | |
| KR | 10-2021-0043474 A | | 4/2021 | | |
| KR | 10-2022-0135129 A | | 10/2022 | | |
| KR | 10-2023-0020315 A | | 2/2023 | | |
| KR | 10-2023-0051024 A | | 4/2023 | | |
| WO | 2019/174751 A1 | | 9/2019 | | |
| WO | 2021/176092 A1 | | 9/2021 | | |
| WO | 2021/249637 A1 | | 12/2021 | | |
| WO | 2022/089725 A1 | | 5/2022 | | |
| WO | 2022/223498 A1 | | 10/2022 | | |

OTHER PUBLICATIONS

Written Opinion (PCT/ISA/237) issued May 27, 2024 by the International Searching Authority in the International Patent Application No. PCT/KR2024/001970.
"O-RAN Working Group 3 (Near-Real-time RAN Intelligent Controller and E2 Interface Workgroup)—Near-RT RIC Architecture", O-Ran Alliance, O-RAN.WG3.RICARCH-v03.00, Oct. 31, 2022. (104 pages total).
"O-RAN Working Group 3, Near-Real-time RAN Intelligent Controller, E2 Application Protocol (E2AP)" O_RAN Alliance, O-RAN. WG3.E2AP-v01.01, Oct. 31, 2020. (86 pages total).
"3rd Generation Partnership Project; Technical Specification Group Radio Access Network; NG-RAN; NG Application Protocol (NGAP) (Release 17)", 3GPP TS 38.413, V17.3.0, Dec. 2022. (577 pages total).
"3rd Generation Partnership Project; Technical Specification Group Radio Access Network; NG-RAN; F1 application protocol (F1AP) (Release 17)", 3GPP TS 38.473, V17.3.0, Dec. 2022. (688 pages total).
"Near-Real-time RAN Intelligent Controller, E2 Application Protocol(E2AP).O-RAN.WG3.E2AP-v01.01", Oct. 31, 2020, O-RAN WG3 Specification O-Ran Alliance, De, 85 pages,.
O-RAN Working Group 2: "O-RAN Working Group 2. Non-RT RIC & A1 Interface: Use Cases and Requirements. O-RAN.WG2. Use-Case-Requirements-v06.00.", Jun. 1, 2022, O-RAN Specification O-RAN, DE, 72 pages.
Tsdsi: "Feasibility of Open-Source for 5G", Telecommunications Standards Development Society, India, Jul. 1, 2021, pp. 1-128, https://tsdsi.in/wp-content/uploads/2020/09/Open-Source-White-Paper.pdf.
Extended European Search Report issued Apr. 29, 2026 by the European Patent Office for EP Patent Application No. 24757158.1.

\* cited by examiner

ELECTRONIC DEVICE AND METHOD FOR OVERLOAD CONTROL

CROSS-REFERENCE TO RELATED APPLICATIONS

This application is a by-pass continuation application of International Application No. PCT/KR2024/001970, filed on Feb. 8, 2024, which is based on and claims priority to Korean Patent Application No. 10-2023-0019044, filed on Feb. 13, 2023, in the Korean Intellectual Property Office, the disclosures of which are incorporated by reference herein their entireties.

BACKGROUND

1. Field

The disclosure relates to an electronic device and a method for controlling overload message, for example, in a wireless communication system.

2. Description of Related Art

5th generation (5G) communication system or a pre-5G communication system has been developed or improved to meet the growing demand for wireless data traffic since the 4th generation (4G) communication system was commercialized. For this reason, the 5G communication system or the pre-5G communication system is often referred to as a Beyond 4G network communication system or a Post Long Term Evolution (LTE) system.

To achieve a high data rate, the 5G communication system is implemented in an ultra-high frequency (millimeter wave (mmWave)) band (e.g., 60 giga-hertz (GHz) band). Further, to mitigate path losses of radio waves and to increase transmission distances of radio waves in the ultra-high frequency band, advanced technologies, such as beamforming, Massive multiple-input multiple-output (MIMO), and Full Dimensional MIMO (FD-MIMO), array antenna, analog beam-forming, and large-scale antenna technologies have been discussed and developed for the 5G communication systems.

Further, to improve networks in the 5G communication system, technologies for evolved small cell and advanced small cell, such as cloud radio access network (cloud RAN), ultra-dense network, device to device (D2D) communication, wireless backhaul, moving network, cooperative communication, coordinated multi-points (CoMP), receive interference cancellation or the like have been developed.

In the 5G communication system, advanced coding modulation (ACM) methods, such as e.g., Hybrid Frequency Shift Keying and Quadrature Amplitude Modulation (FQAM) and Sliding Window Superposition Coding (SWSC) have been developed. Advanced access technologies, such as e.g., Filter Bank Multi Carrier (FBMC), Non-Orthogonal Multiple Access (NOMA), and Sparse Code Multiple Access (SCMA), have been developed.

To meet the demand for wireless data traffic, the 5G system, so-called new radio (NR), has been commercialized. NR provides users with high data rate services through the 5G system like 4G, and wireless communication services for various purposes, such as services requiring high reliability for specific purposes and Internet of Things, can be provided. Open radio access network (O-RAN) was established by operators and equipment providers in a mixed system such as the current 4th generation communication system and 5th generation system. O-RAN defines E2 application protocol (E2AP) of the E2 interface between E2 node and Near-real time (RT) radio access network (RAN) intelligent controller (RIC).

Considering the development of wireless communication from generation to generation, the technologies have been developed mainly for services targeting humans, such as voice calls, multimedia services, and data services. Following the commercialization of 5th generation (5G) communication systems, the number of connected devices will exponentially grow. Increasingly, these will be connected to communication networks. Examples of connected things includes vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. To provide various services by connecting hundreds of billions of devices and things in the 6th generation (6G) era, there have been ongoing efforts to develop improved 6G communication systems. For these reasons, 6G communication systems are referred to as 'beyond-5G' systems.

The 6G communication systems will have a peak data rate of tera (1,000 giga)-level bit per second (bps) and a radio latency less than 100 μsec, and thus, will be 50 times as fast as 5G communication systems and have the $\frac{1}{10}$ radio latency thereof.

To accomplish such a high data rate and an ultra-low latency, it has been considered to implement 6G communication systems in a terahertz (THz) band (for example, 95 gigahertz (GHz) to 3 THz bands). Due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multi-antenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

To improve the spectral efficiency and the overall network performances, the following technologies have been developed for 6G communication systems: a full-duplex technology for enabling an uplink transmission and a downlink transmission to simultaneously use the same frequency resource at the same time, a network technology for utilizing satellites, High-Altitude Platform Stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of Artificial Intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

Research and development of 6G communication systems in hyper-connectivity, including person to machine (P2M) as well as machine to machine (M2M), will allow the next hyper-connected experience. Particularly, services such as truly immersive extended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In the 6G communication system, the function of the RAN is further subdivided and is expected to be separated into service subscribers and service providers. In a service-based network, the subscription service confirmation procedure for service subscription status will be applied to various functions.

The above information is presented as background information only to assist with an understanding of the disclosure. No determination has been made, and no assertion is made, as to whether any of the above might be applicable as prior art with regard to the disclosure.

SUMMARY

According to an aspect of the disclosure, a method performed by a first station (e.g., a E2 node), the method includes: identifying a load status of the first station; and transmitting, to a second station, a status indication message includes overload information for indicating the load status of the first station, wherein the overload information indicates whether the load status of the first station is overloaded or not-overloaded.

According to an aspect of the disclosure, a method performed by a second station (e.g., a near-real time (Near-RT) radio access network (RAN) intelligent controller (RIC)), includes: receiving, from a first station, a status indication message includes overload information; and identifying a load status of the first station, based on the overload information, wherein the overload information indicates whether the load status of the first station is overloaded or not-overloaded.

According to an aspect of the disclosure, a method performed by an E2 node is provided. The method comprises receiving, from a near-real time (Near-RT) radio access network (RAN) intelligent controller (RIC), a first message indicating that load status for a RAN function or a RIC subscription associated with the RAN function is overloaded in the Near-RT RIC; based on the first message, suspend a procedure related to the RAN function or the RIC subscription until receiving a second message indicating that the load status for the RAN function or the RIC subscription associated with the RAN function is not overloaded in the Near-RT RIC; receiving, from the Near-RT RIC, the second message; and based on the second message, resuming the procedure related to the RAN function or the RIC subscription.

According to an aspect of the disclosure, a method performed by a near-real time (Near-RT) radio access network (RAN) intelligent controller (RIC) is provided. The method comprises transmitting, to a E2 node, a first message indicating that load status for a RAN function or a RIC subscription associated with the RAN function is overloaded in the Near-RT RIC; and transmitting, to the E2 node, a second message indicating that the load status is not overloaded in the Near-RT RIC. The first message cause the E2 node to suspend a procedure related to the RAN function or the RIC subscription until receiving the second message. The second message causes the E2 node to resume the procedure related to the RAN function or the RIC subscription.

According to an aspect of the disclosure, a device of an E2 node is provided. The device comprises memory storing instructions, at least one transceiver, and a processor. The instructions cause, when executed by the processor, the device to control the at least one transceiver to receive, from a near-real time (Near-RT) radio access network (RAN) intelligent controller (RIC), a first message indicating that load status for a RAN function or a RIC subscription associated with the RAN function is overloaded in the Near-RT RIC, based on the first message, suspend a procedure related to the RAN function or the RIC subscription until receiving a second message indicating that the load status for the RAN function or the RIC subscription associated with the RAN function is not overloaded in the Near-RT RIC, control the at least one transceiver to receive, from the Near-RT RIC, the second message, and based on the second message, resume the procedure related to the RAN function or the RIC subscription.

According to an aspect of the disclosure, a device of a near-real time (Near-RT) radio access network (RAN) intelligent controller (RIC) is provided. The device comprises memory storing instructions, at least one transceiver; and a processor, The instructions cause, when executed by the processor, the device to control the at least one transceiver to transmit, to a E2 node, a first message indicating that load status for a RAN function or a RIC subscription associated with the RAN function is overloaded in the Near-RT RIC; and control the at least one transceiver to transmit, to the E2 node, a second message indicating that the load status is not overloaded in the Near-RT RIC. The first message causes the E2 node to suspend a procedure related to the RAN function or the RIC subscription until receiving the second message. The second message causes the E2 node to resume the procedure related to the RAN function or the RIC subscription.

According to an aspect of the disclosure, a non-transitory computer-readable storage medium is provided. The non-transitory computer-readable storage medium comprises memory storing instructions. The instructions cause, when executed by a processor, an E2 node to receive, from a near-real time (Near-RT) radio access network (RAN) intelligent controller (RIC), a first message indicating that load status for a RAN function or a RIC subscription associated with the RAN function is overloaded in the Near-RT RIC, based on the first message, suspend a procedure related to the RAN function or the RIC subscription until receiving a second message indicating that the load status for the RAN function or the RIC subscription associated with the RAN function is not overloaded in the Near-RT RIC, receive, from the Near-RT RIC, the second message, and based on the second message, resume the procedure related to the RAN function or the RIC subscription.

According to an aspect of the disclosure, a non-transitory computer-readable storage medium is provided. The non-transitory computer-readable storage medium comprises memory storing instructions. The instructions cause, when executed by a processor, a near-real time (Near-RT) radio access network (RAN) intelligent controller (RIC) to transmit, to a E2 node, a first message indicating that load status for a RAN function or a RIC subscription associated with the RAN function is overloaded in the Near-RT RIC; and transmit, to the E2 node, a second message indicating that the load status is not overloaded in the Near-RT RIC. The first message causes the E2 node to suspend a procedure related to the RAN function or the RIC subscription until receiving the second message. The second message causes the E2 node to resume the procedure related to the RAN function or the RIC subscription.

According to embodiments, a method performed by an E2 node ("first station") is provided. The method comprises identifying a load status of the E2 node. The method comprises transmitting, to a near-real time (Near-RT) radio access network (RAN) intelligent controller (RIC), a status indication message including overload information for indicating the load status of the E2 node. The overload information indicates whether the load status of the e2 node is overloaded or not-overloaded.

According to embodiments, a method performed by a near-real time (Near-RT) radio access network (RAN) intelligent controller (RIC) ("second station") is provided. The method comprises receiving, from an E2 node, a status indication message including overload information. The method comprises identifying a load status of the E2 node based on the overload information. The overload information indicates whether the load status of the e2 node is overloaded or not-overloaded.

According to embodiments, a device of an E2 node is provided. The device comprises a memory configured to store instructions, at least one transceiver; and at least one processor. The instructions cause, when executed by the at least one processor, the device to identify a load status of the E2 node and control the at least one transceiver to transmit, to a near-real time (Near-RT) radio access network (RAN) intelligent controller (RIC), a status indication message including overload information for indicating the load status of the E2 node. The overload information indicates whether the load status of the E2 node is overloaded or not-overloaded.

According to embodiments, a device performed by a near-real time (Near-RT) radio access network (RAN) intelligent controller (RIC) is provided. The device comprises a memory configured to store instructions, at least one transceiver; and at least one processor. The instructions cause, when executed by the at least one processor, the device to control the at least one transceiver to receive, from an E2 node, a status indication message including overload information; and identify a load status of the E2 node based on the overload information. The overload information indicates whether the load status of the e2 node is overloaded or not-overloaded.

According to embodiments, a method performed by an E2 node is provided. The method comprises receiving, from a near-real time (Near-RT) radio access network (RAN) intelligent controller (RIC), a first message for indicating that load status of the Near-RT RIC is overloaded. The method comprises waiting for signaling on E2 interface until receiving a second message indicating that the load status of the Near-RT RIC is not overloaded, based on the first message. The method comprises receiving, from the Near-RT RIC, the second message. The method comprises performing the signaling on the E2 interface after receiving the second message.

According to embodiments, a method performed by a near-real time (Near-RT) radio access network (RAN) intelligent controller (RIC) is provided. The method comprises transmitting, to an E2 node, a first message for indicating that load status of the Near-RT RIC is overloaded. The method comprises transmitting, to the E2 node, a second message indicating that the load status of the Near-RT RIC is not overloaded. The first message configures the E2 node to wait for signaling on E2 interface until receiving the second message.

According to embodiments, A device performed by an E2 node is provided. The device comprises a memory configured to store instructions, at least one transceiver; and at least one processor. The instructions cause, when executed by the at least one processor, the device to control the at least one transceiver to receive, from a near-real time (Near-RT) radio access network (RAN) intelligent controller (RIC), a first message for indicating that load status of the Near-RT RIC is overloaded, wait for signaling on E2 interface until receiving a second message indicating that the load status of the Near-RT RIC is not overloaded, based on the first message, control the at least one transceiver to receive, from the Near-RT RIC, the second message, and perform the signaling on the E2 interface after receiving the second message.

According to embodiments, A device of a near-real time (Near-RT) radio access network (RAN) intelligent controller (RIC), the device comprises a memory configured to store instructions, at least one transceiver, and at least one processor. The instructions cause, when executed by the at least one processor, the device to control the at least one transceiver to transmit, to an E2 node, a first message for indicating that load status of the Near-RT RIC is overloaded and control the at least one transceiver to transmit, to the E2 node, a second message indicating that the load status of the Near-RT RIC is not overloaded. The first message configures the E2 node to wait for signaling on E2 interface until receiving the second message.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
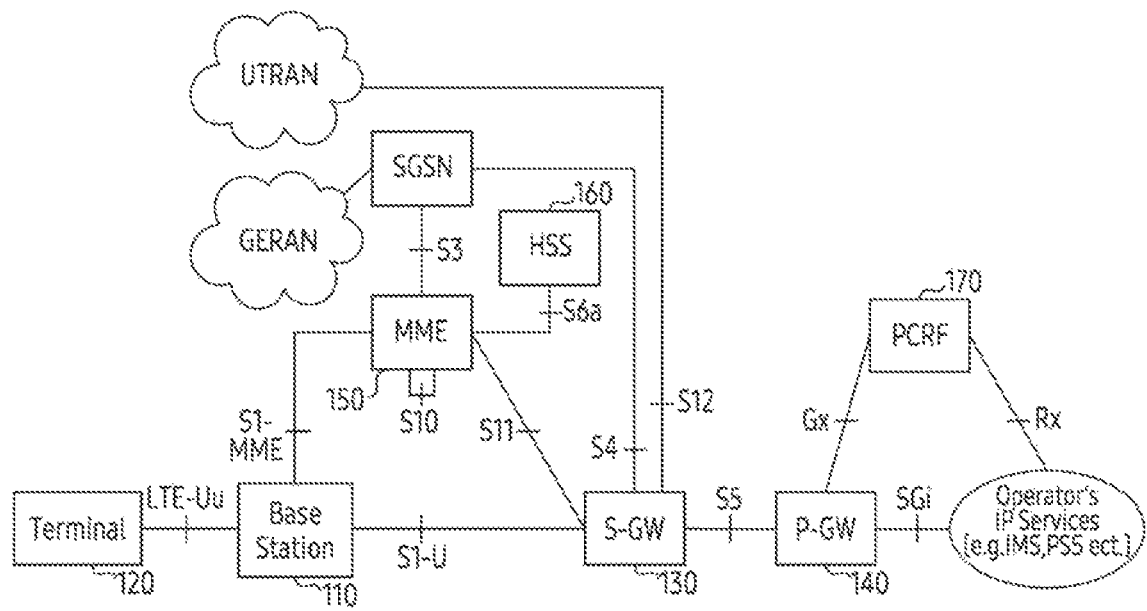
FIG. 1 illustrates an example of a 4th generation (4G) Long Term Evolution (LTE) core system.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since one or more embodiments of the disclosure include a technology that utilizes both the hardware and the software, they are not intended to exclude the software-based approach.

As used in the following description, the terms referring to a configuration (e.g., setup, setting, arrangement, control), the terms referring to a signal (e.g., packet, message, signal, information, signaling), the terms referring to a resource (e.g., section, symbol, slot, subframe, radio frame, subcarrier, resource element (RE), resource block (RB), bandwidth part (BWP), occasion), the terms for indicating an operating state (e.g., step, operation, procedure), the terms referring to data (e.g., packet, message, user stream, information, bit, symbol, codeword), the terms referring to a channel, the terms referring to network entities (distributed unit (DU), radio unit (RU), central unit (CU), CU-control plane (CP) (CU-CP), open radio access network (O-RAN) DU (O-DU), O-RAN RU (O-RU), O-RAN CU (O-CU), O-RAN CU-user plane (UP) (O-CU-UP), O-RAN CU-CP (O-CU-CP)), the terms referring to components of an apparatus, and so on are illustrated for convenience of description. Therefore, the disclosure is not limited to those terms described below, and other terms having equivalent technical meanings thereto may be used therefor. In addition, as used herein, the terms such as e.g., ' . . . unit', ' . . . module', ' . . . group', ' . . . part' may mean at least one form of structure or a unit that processes a certain function.

Further, throughout the disclosure, an expression such as e.g., 'above (or exceeding)' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with 'above', a condition described as 'less than or equal to' may be replaced with 'below', and a condition described as 'more than or equal to' and 'below' may be replaced with 'above' and 'less than or equal to', respectively. Further, unless explicitly dictated otherwise, 'A' to 'B' is intended to mean at least one of the elements from A to (inclusive of A) and B (inclusive of B). Hereinafter, unless explicitly dictated otherwise, 'C' and/or 'D' is intended to mean at least one of 'C' or 'D', that is, {'C', 'D', 'C' and 'D'}.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The disclosure describes one or more embodiments using the terms used in some communication standard specifications (e.g., 3$^{rd}$ Generation Partnership Project (3GPP), extensible radio access network (xRAN), open-radio access network (O-RAN), but they are merely of an example for description. One or more embodiments of the disclosure may be easily modified and applied even in other communication systems.

Along with the commercialization of 4G communication system and 5G communication systems (e.g., New Radio (NR)), differentiated service supports have been ever required for users in a virtualized network. Thus, the 3GPP has been originated from a joint research project between several mobile communication-related organizations, aiming to create a 3G mobile communication system specification, globally applicable, within the scope of IMT-2000 project of the International Telecommunication Union (ITU). The 3GPP was established in December 1998, and the 3GPP specification is based on the advanced GSM standard, including all of radio, core network, and service architecture in the standardization range. Accordingly, the O-RAN has newly defined radio unit (RU), digital unit (DU), central unit (CU)-control plane (CP), and CU-user plane (UP), which are nodes constituting a 3GPP network entity (NE) and a base station, as O-RAN (O)-RU, O-DU, O-CU-CP, and O-CU-UP, respectively, and additionally standardized the near-real-time (near-RT) radio access network intelligent controller (RIC). According to one or more embodiments, the disclosure is directed to an operator specific service model in an E2 interface in which a RIC requests a service from O-DU, O-CU-CP or O-CU-UP. Here, O-RU, O-DU, O-CU-CP, and O-CU-UP may be understood as objects constituting a RAN capable of operating according to an O-RAN standard, and may be referred to as 'E2 nodes.' An interface with the objects constituting the RAN capable of operating according to the O-RAN standard between the RIC and the E2 nodes uses an E2AP, which is an application protocol.

The RIC is a logical node that may collect information on a cell site where a terminal, an O-DU, an O-CU-CP, or an O-CU-UP transmits and receives. The RIC may be implemented in the form of servers concentrated in one physical location. Connections may be established between O-DU and RIC, between O-CU-CP and RIC, and between O-CU-UP and RIC through Ethernet. To this end, the interface standard specification for communication between O-DU and RIC, between O-CU-CP and RIC, and between O-CU-UP and RIC are required, and the definitions of the message specification for E2-DU, E2-CU-CP, E2-CU-UP or the like and the procedures between O-DU, O-CU-CP, O-CU-UP and RIC are required as well. In particular, it is necessary to define the functions of E2-DU, E2-CU-CP, and E2-CU-UP messages for supporting services for a wide range of cell coverage, as the differentiated service support is required for users in a virtualized network and the call processing messages/functions generated in the O-RAN are concentrated on the RIC. In an embodiment, the RIC may be referred as a network controller or a RAN controller, etc.

The RIC may perform communications with O-DU, O-CU-CP, and O-CU-UP using the E2 interface, and generate and transmit a subscription message to set event occurrence conditions. More specifically, the RIC may generate an E2 subscription request message and transfer the same to an E2 node (e.g., O-CU-CP, O-CU-UP, O-DU) to set a call processing EVENT. Further, subsequent to setting the call processing EVENT, the E2 node may transmit a subscription request response message transferred to the RIC.

The E2 node may transmit the current status to the RIC through an E2 indication/report. The RIC may use an E2 control message to control O-DU, O-CU-CP, and O-CU-UP. One or more embodiments of the disclosure propose an E2 indication message that transmits a UE unit of measurement information for each period set in a subscription event condition in the O-DU. Furthermore, one or more embodiments of the disclosure propose a message for controlling a resource transmitted from the RIC to the O-DU.

FIG. 1 illustrates an example of a fourth generation (4G) Long Term Evolution (LTE) core system.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure that provides wireless access to the terminal 120. For example, the base station 110 is an apparatus that collects state information of the terminal 120, such as a buffer state, an available transmission power, or a channel state, to perform scheduling. The base station 110 has a coverage defined as a certain geographic area based on a distance capable of transmitting a signal. The base station 110 is connected to the MME 150 through an S1-MME interface. In addition, the base station 110 may be also referred to as 'access point (AP)', 'eNodeB (eNB)', 'wireless point', 'transmission/reception point (TRP)', or other terms having an equivalent technical meaning thereto.

The terminal 120, which is a device used by a user, performs communications with the base station 110 through a radio channel. In some cases, the terminal 120 may be operated without any user involvement. For example, the terminal 120 may be a device to perform machine-type communication (MTC), and may not be carried by a user. Further, the terminal 120 may be referred to as 'user equipment (UE)', 'mobile station', 'subscriber station', 'customer-premises equipment (CPE)', 'remote terminal', 'wireless terminal', 'user device', or any other term having an equivalent meaning thereto.

The S-GW 130 provides a data bearer, and generates or controls the data bearer under the control of the MME 150. For example, the S-GW 130 may process packets arriving from the base station 110 or packets to be forwarded to the base station 110. Further, the S-GW 130 may serve as an anchor during handover of the terminal 120 between base stations. The P-GW 140 may serve as a connection point with an external network (e.g., an Internet network). Further, the P-GW 140 may allocate an Internet Protocol (IP) address to the terminal 120 and serves as an anchor for the S-GW 130. Further, the P-GW 140 may apply a quality of service (QoS) policy of the terminal 120 and manage account data.

The MME 150 manages mobility of the terminal 120. Further, the MME 150 may perform authentication, bearer management, and so on for the terminal 120. That is to say, the MME 150 is in charge of mobility management and various control functions for the terminal. The MME 150 may be associated with a serving general packet radio service (GPRS) support node (SGSN).

The HSS 160 stores key information and subscriber profile for authentication of the terminal 120. The key information and the subscriber profile are transmitted from the HSS 160 to the MME 150 when the terminal 120 makes access to a network.

The PCRF 170 defines rules for the policy and the charging. The stored information is transmitted from the PCRF 170 to the P-GW 140, and the P-GW 140 may perform control (e.g., QoS management, charging, etc.) of the terminal 120 based on the information provided from the PCRF 170.

Carrier aggregation (hereinafter, referred to as 'CA') may be capable of combining multiple component carriers and transmitting/receiving signals using such multiple component carriers at the same time, thereby increasing the efficiency of frequency use from the viewpoint of a terminal or a base station. Specifically, according to the CA technology, the terminal and the base station may transmit and receive signals using a broadband, using multiple component carriers in uplink (UL) and downlink (DL), respectively. Each of the component carriers is located in a different frequency band. Hereinafter, the term 'uplink' refers to a communication link the terminal transmits a signal to the base station, and the term 'downlink' refers to a communication link the base station transmits a signal to the terminal. In such a circumstance, the number of uplink component carriers and downlink component carriers may be different from each other.

Dual connectivity or multi-connectivity may increase the efficiency of frequency use from the viewpoint of a terminal or base station, by having one terminal connected to multiple base stations to transmit and receive signals simultaneously using carriers in the multiple base stations located in different frequency bands. The terminal may be connected to a first base station (e.g., a base station providing services using LTE technology or 4G mobile communication technology) and a second base station (e.g., a base station providing services using NR technology or 5G mobile communication technology) at the same, to transmit and receive traffic. In such a case, the frequency resources used by each base station may be located in different bands. As such, a scheme that operates based on a dual connectivity with LTE and NR may be referred to as 5G non-standalone (NSA).

Figure 2A:
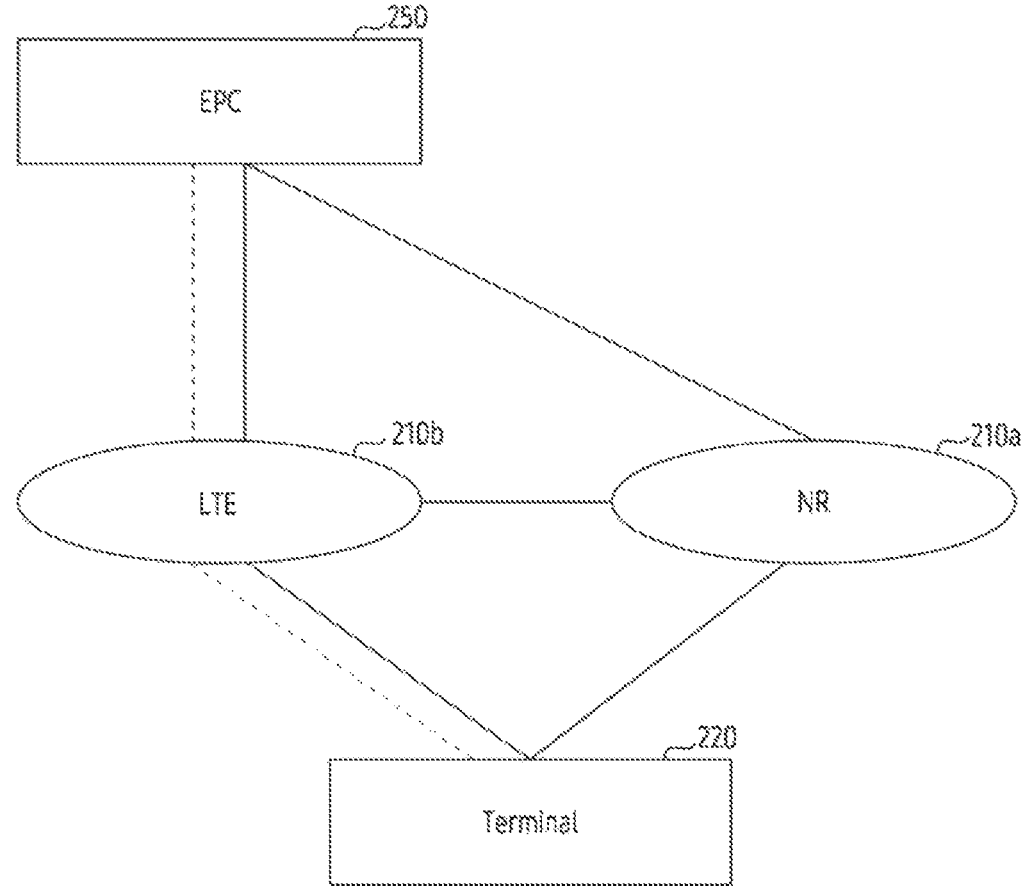
FIG. 2A illustrates an example of a 5th generation (5G) non-standard alone (NSA) system.

FIG. 2A illustrates an example of a 5G NSA system.

Referring to FIG. 2A, the 5G NSA system includes an NR RAN 210a, an LTE RAN 210b, a terminal 220, and an evaded packet core (EPC) 250. The NR RAN 210a and the LTE RAN 210b are connected to the EPC 250, and the terminal 220 may receive a service from either one or both of the NR RAN 210a and the LTE RAN 210b at the same time. The NR RAN 210a includes at least one NR base station, and the LTE RAN 210b includes at least one LTE base station. Here, the NR base station may be referred to as '5$^{th}$ generation (5G) node,' 'next generation nodeB (gNB),' or other terms having an equivalent technical meaning. Further, the NR base station may have a structure separated by a central unit (CU) and a digital unit (DU), and the CU may also have a structure separated by a control plane (CU-CP) unit and a user plane (CU-UP) unit.

In the structure shown in FIG. 2A, the terminal 220 may perform a radio resource control (RRC) connection through a first base station (e.g., a base station belonging to LTE RAN 210b) and may be served with a function (e.g., connection management, mobility management, etc.) provided in the control plane. Further, the terminal 220 may be provided with an additional radio resource for transmitting and receiving data through a second base station (e.g., a base station belonging to NR RAN 210a). Such dual connectivity technology using the LTE and the NR may be referred to as EN-DC (evolved universal terrestrial radio access (E-UTRA)-NR dual connectivity). Similarly, the dual connectivity technology that the first base station uses the NR technology and the second base station uses the LTE technology may be referred to as NR-DC (NR-E-UTRA dual connectivity). Further, one or more embodiments may be applied to various other forms of multi-connectivity and carrier aggregation technologies. Furthermore, one or more embodiments may be also applied in a case where a first system (using a first communication technology) and a second system (using a second communication technology) are implemented in one device, or in a case where a first base station and a second base station are located in the same geographical location.

Figure 2B:
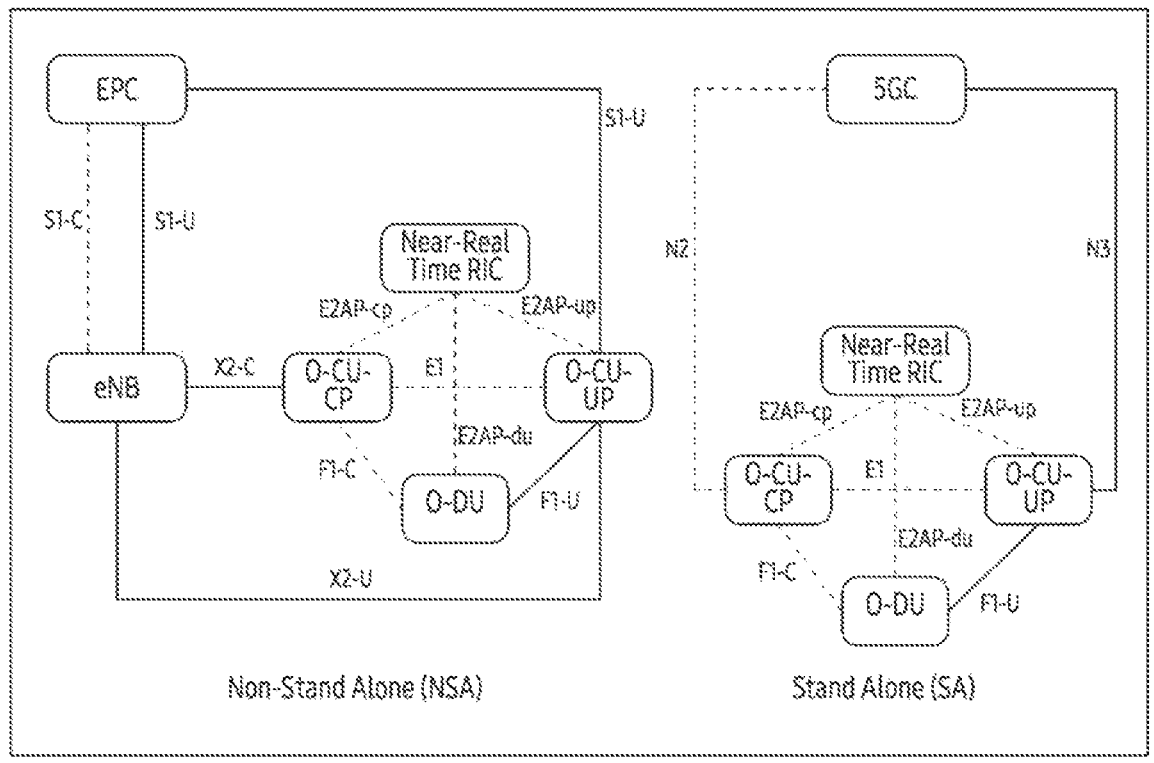
FIG. 2B illustrates an example of an architecture for open radio access network (O-RAN)

FIG. 2B illustrates an example of an architecture for O-RAN. For the purpose of E2-SM-KPIMON (key performance indicator (KPI) monitoring) of an E2 service model, an O-RAN NSA mode in multi-connectivity operation using E-UTRA and NR radio access technology may be considered, while the E2 node may be assumed to be in O-RAN standalone (SA) mode.

Referring to FIG. 2B, in deployment of the O-RAN NSA mode, the eNB may be connected to the EPC via an S1-C/S1-U interface, and may be connected to the O-CU-CP via an X2 interface. The O-CU-CP for deployment of the O-RAN SA mode may be connected to the 5GC (5G core) via an N2/N3 interface.

Currently, discussions are underway to improve and enhance performance of the initial 5G mobile communication technology in consideration of the services that the 5G mobile communication technology was intended to support and physical layer standardization for technologies such as Vehicle-to-Everything (V2X) to help determine the driving of an autonomous vehicle based on its own location and status information transmitted by the vehicle and increase user convenience, New Radio Unlicensed (NR-U), which aims to operate a system that meets various regulatory requirements in unlicensed bands, NR terminal low power consumption technology (UE Power Saving), Non-Terrestrial Network (NTN), which is direct terminal-satellite communication to secure coverage in areas where communication with the terrestrial network is impossible, and positioning are in progress.

In addition, standardization in the field of air interface architecture/protocol for Technologies such as intelligent factories (Industrial Internet of Things, IIoT) for new service support through linkage and convergence with other industries, Integrated Access and Backhaul (IAB), which provides nodes for network service area expansion by integrating and supporting wireless backhaul links and access links, mobility enhancement including conditional handover and dual active protocol stack (DAPS) handover, and 2-step random access (2-step RACH for NR) that simplifies the random access procedure is also in progress and standardization in the field of system architecture/service like 5G baseline architecture (e.g., Service based Architecture, Service based Interface) for grafting of Network Functions Virtualization (NFV) and Software-Defined Networking (SDN) technologies, based on the location of the device about Mobile Edge Computing (MEC), etc. is also in progress.

If such a 5G mobile communication system is commercialized, the explosively increasing trend of connected devices will be connected to the communication network and accordingly, it is expected that the function and performance enhancement of the 5G mobile communication system and the integrated operations of connected devices will be required. To this end, augmented reality (AR), virtual reality (VR), mixed reality (MR), etc. to efficiently support extended Reality (XR) and artificial intelligence (AI) and machine learning (ML), new research on 5G performance improvement and complexity reduction, AI service support, metaverse service support, and drone communication will be conducted. To this end, new studies regarding extended Reality (XR) to efficiently support augmented reality (AR), virtual reality (VR), mixed reality (MR), etc. to efficiently support and 5G performance improvement and complexity reduction utilizing artificial intelligence (AI) and machine learning (ML), AI service support, metaverse service support, drone communication, etc. are forthcoming.

In addition, the development of these 5G mobile communication systems could be the basis for development of not only multi-antenna transmission technology like New waveforms to ensure coverage in the terahertz band of 6G mobile communication technology, Full Dimensional MIMO (FD-MIMO), array antenna, large scale antenna, metamaterial-based lenses and antennas to improve coverage of terahertz band signals, high-dimensional spatial multiplexing technology using Orbital Angular Momentum (OAM), Reconfigurable Intelligent Surface (RIS) technology, but also full duplex technology to improve frequency efficiency and system network of 6G mobile communication technology, Artificial Intelligence (AI)-based communication technology that realizes system optimization by utilizing satellite and AI from the design stage and internalizing end-to-end AI support functions, next-generation distributed computing technology that realizes complex services that exceed the limits of terminal computing capabilities by utilizing ultra-high-performance communication and computing resources, etc.

Although illustrated in FIGS. 1, 2A, and 2B as an example in a 4G and/or 5G environment, this description does not limit the scope of the communication environment of the embodiments of the disclosure. Features of embodiments of the disclosure may also be applied to 6G and post-6G communication technologies and network environments.

Figure 3:
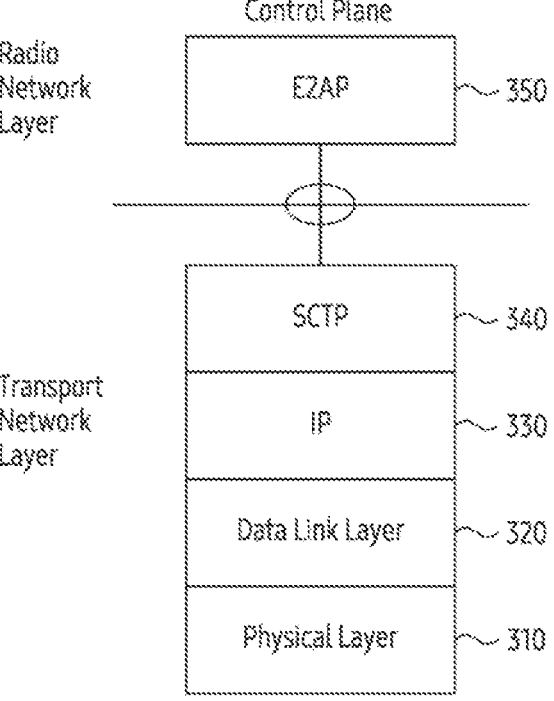
FIG. 3 illustrates a protocol stack of an E2 application protocol message in a radio access network.

FIG. 3 illustrates an example of a protocol stack of an E2 application protocol message in a radio access network. Referring to FIG. 3, a control plane includes a transport network layer and a radio network layer. The transport network layer includes a physical layer 310, a data link layer 320, an Internet protocol (IP) 330, and a stream control transmission protocol (SCTP) 340.

The radio network layer includes an E2AP 350. The E2AP 350 may be used to deliver a subscription message, an indication message, a control message, a service update message, and a service query message, and may be transmitted from a higher layer of the SCTP 340 and the IP 330.

Figure 4:
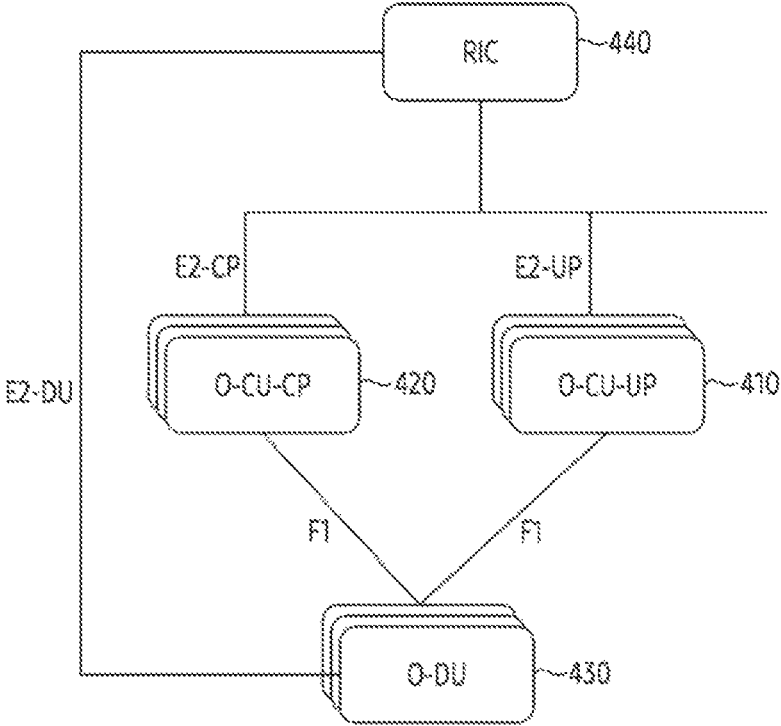
FIG. 4 illustrates an example of a connection between a base station and a radio access network (RAN) intelligence controller (RIC) in a radio access network.

FIG. 4 illustrates an example of connection between a base station and a RIC in a radio access network.

Referring to FIG. 4, the RIC 440 is connected to the O-CU-UP 410, the O-CU-CP 420, and the O-DU 430. The RIC 440 may customize the RAN functionality for new services or regional resource optimization. The RIC 440 may provide network intelligence (e.g., policy enforcement, handover optimization), resource assurance (e.g., radio-link management, advanced self-organized network (SON), resource control (e.g., load balancing, slicing policy) or the like. The RIC 440 may communicate with the O-CU-CP 420, the O-CU-UP 410, and the O-DU 430. The RIC 440 may be connected to each node through E2-CP, E2-UP, and E2-DU interfaces. Further, the interface between the O-CU-CP and the DU, and/or between the O-CU-UP and the DU may be referred to as an F1 interface. In the following description, DU and O-DU, CU-CP and O-CU-CP, and CU-UP and O-CU-UP may be respectively used interchangeably with each other.

Although FIG. 4 illustrates one RIC 440, a plurality of RICs may exist according to one or more embodiments. The plurality of RICs may be implemented with a plurality of hardware located in the same physical location or may be implemented by means of virtualization using one hardware.

Figure 5:
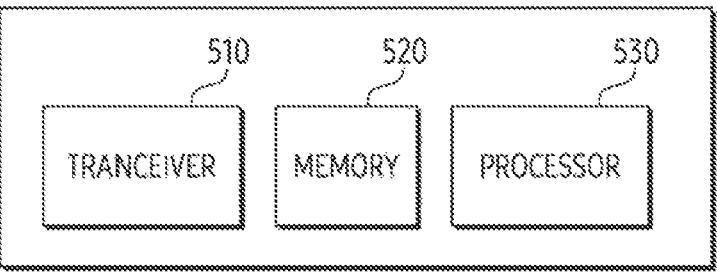
FIG. 5 illustrates a configuration of an apparatus in a radio access network.

FIG. 5 illustrates an example of a configuration of an apparatus. The configuration illustrated in FIG. 5 may be understood as a configuration of a device having at least one function of near-RT RIC, non-RT RIC, O-CU-CP, O-CU-UP, and O-DU of FIG. 4. As used hereunder, the terms such as '~module', '~unit', '~group', '~part', or the like may refer to a unit that process at least one function or operation, which may be implemented as hardware, software, or a combination of hardware and software.

Referring to FIG. 5, a core network device includes a transceiver 510, a memory 520, and a processor 530.

The transceiver 510 provides an interface for performing communication with other devices in a network. In other words, the transceiver 510 converts a bit string transmitted from the core network device to another device into a physical signal and converts the physical signal received from the other device into a bit string. That is, the transceiver 510 may transmit and receive signals. Accordingly, the transceiver 510 may be referred to as a modem, a transmit unit, a receive unit, or a transmit/receive unit. In this case, the transceiver 510 enables the core network device to communicate with other devices or systems through a backhaul connection (e.g., wired backhaul or wireless backhaul) or through the network. The transceiver 510 may include one or more transceivers.

The memory 520 stores data such as e.g., a basic program, an application program, and setting information for an overall operation of the core network device. The storage 520 may include a volatile memory, a non-volatile memory, or a combination of the volatile memory and the non-volatile memory. Further, the memory 520 provides the stored data according to a request of the processor 530.

The processor 530 controls overall operations of the core network device. For example, the processor 530 transmits and receives signals through the transceiver 510. Further, the processor 530 records and reads data in/from the memory 520. To this end, the processor 530 may include at least one processor. According to one or more embodiments, the processor 530 may control the apparatus to perform operations according to one or more embodiments described in the disclosure.

Figure 6:
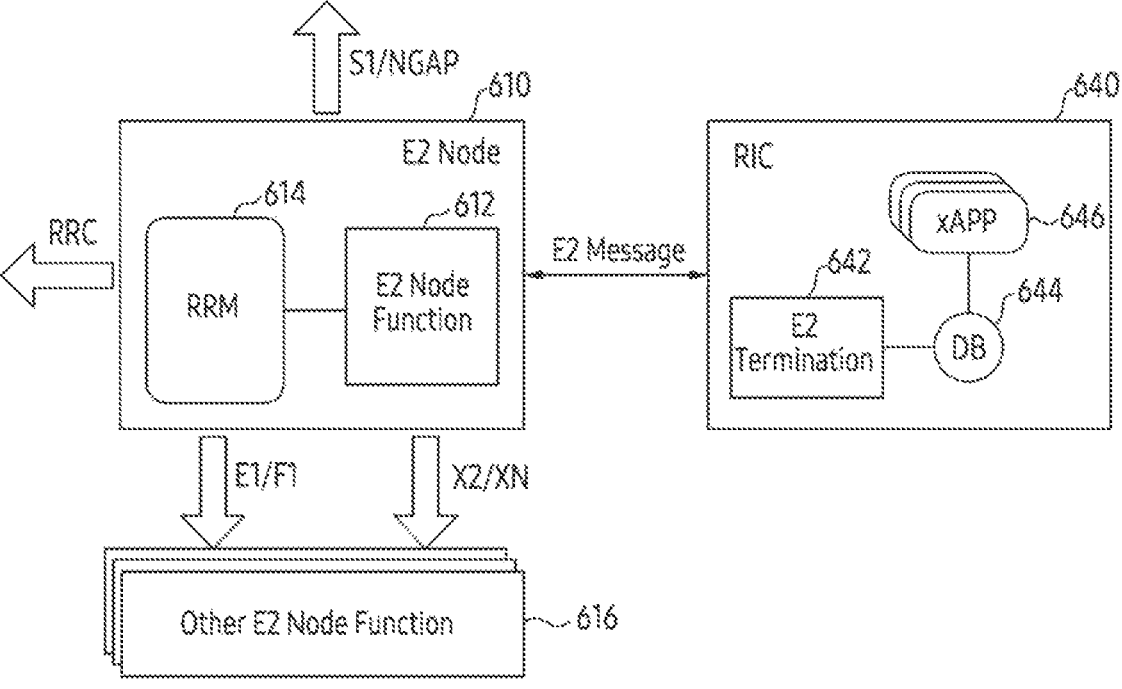
FIG. 6 illustrates logical functions related to an E2 message of a RIC and an E2 node in a radio access network.

FIG. 6 illustrates a logical function related to an E2 message of an E2 node and a RIC in a radio access network.

Referring to FIG. 6, a RIC 640 and an E2 node 610 may transmit or receive E2 messages to/from each other. For example, the E2 node 610 may be an O-CU-CP, an O-CU-UP, an O-DU, or a base station. The communication interface of the E2 node may be determined depending upon the type of the E2 node 610. For example, the E2 node 610 may communicate with another E2 node 616 through an E1 interface or an F1 interface. Alternatively, for example, the E2 node 610 may communicate with the E2 node 616 via an X2 interface or an XN interface. Alternatively, for example, the E2 node 610 may perform communication through an S1 interface or a next generation application protocol (NGAP) interface (i.e., an interface between a next generation (NG) RAN node and an AMF).

The E2 node 610 may include an E2 node function 612. The E2 node function 612 corresponds to a specific xApp (application software (S/W)) 646 installed in the RIC 640. For example, in case of a KPI monitor, KPI monitor collection S/W may be installed in the RIC 640, and the E2 node 610 may include the E2 node function 612 that generates KPI parameters and then delivers an E2 message including the KPI parameters to an E2 termination 642 located in the RIC 640. The E2 node 610 may include a radio resource management (RRM) 614. The E2 node 610 may manage resources provided to a radio network for a terminal. xApp 646 is an application designed to run on the Near-RT RIC. The application may consist of one or more micro services and at the point of on-boarding will identify which data it consumes and which data it provides. The application is independent of the Near-RT RIC and may be provided by any third party. The E2 interface enables a direct association between the xApp 646 and the RAN functionality.

The E2 termination 642 (located in the RIC 640) is a termination of the RIC 640 for the E2 message, and performs a function of interpreting the E2 message delivered (or transmitted) by the E2 node 610, and then, delivering the E2 message to the xApp 646. A database 644 (located in the RIC 640) may be used for the E2 termination 642 and the xApp 646. The E2 node 610 (shown in FIG. 6) is a terminal of at least one interface, and may be understood as a termination of messages transmitted to a terminal, a neighboring base station, and a core network.

Figure 7:
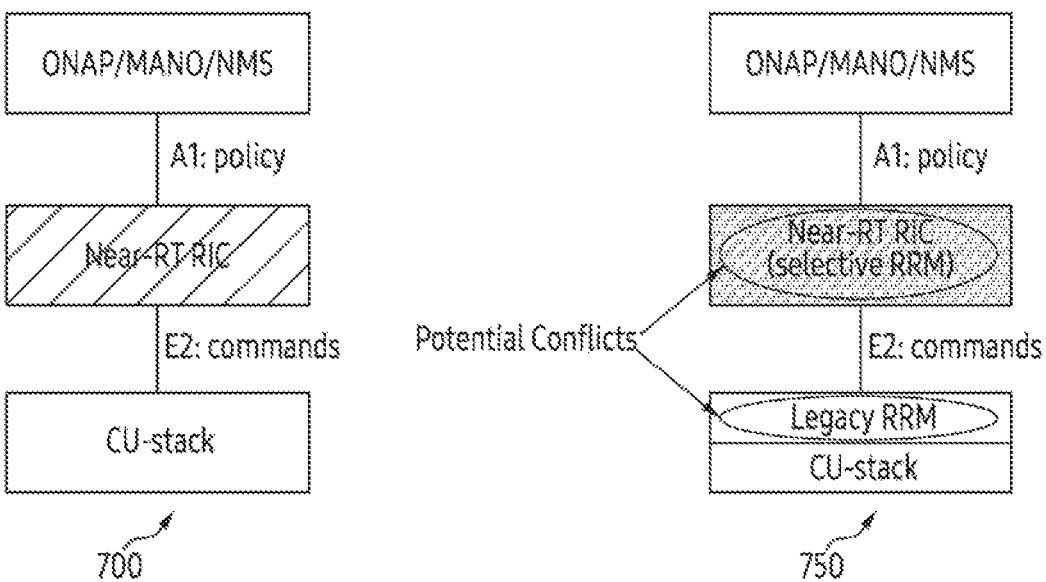
FIG. 7 illustrates examples of functional separation between an E2 node and a RIC.

FIG. 7 illustrates examples of functional separations between an E2 node and a RIC. The O-RAN specification provides functional separations between the E2 node and the RIC. For example, the E2 node may be a CU, and the RIC may be a near-RT RIC. The RIC may be connected to open network automation platform (ONAP)/management and orchestration (MANO)/network management system (NMS) through an A1 interface. The RIC may be connected to the E2 node through an E2 interface. The E2 interface may deliver commands. Functional separation options may include functional separation 700 that manages the entire radio resource management (RRM) in the near-RT RIC, and functional separation 750 that optionally manages the RRM in the near-RT RIC.

In related art, the near-RT RIC may support E2 with an open logical interface aimed at multiple vendor environments, regardless of the implementation of specific RRC-RRM algorithms or operations located in near-RT RIC. In one embodiment, E2 Service Model Radio Interface Control (E2SM-RIC) may be paired with E2SM-NI capable of performing injection/modification/configuration of a Per UE RRC message for each I/F and network entity. In other words, the near-RT RIC can be gradually improved from the functional separation 750 toward the functional separation 700. E2 interface may evolve into an open logical interface that may be independent of the implementation of a certain RRC-RRM algorithm or operation in the near-RT RIC and may aim at multi-vendor environments.

Figure 8:
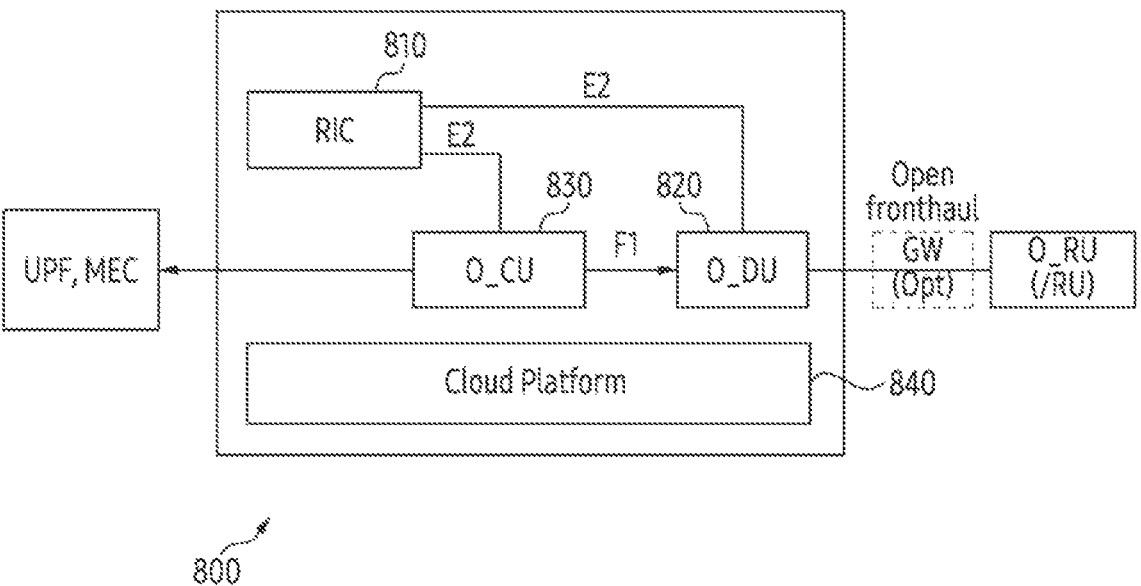
FIG. 8 illustrates an example of implementation of an E2 node and a RIC.

FIG. 8 illustrates an example of a system 800 having an E2 node (O-DU 820, O-CU 830) and a RIC 810. In the system 800, the E2 node (O-DU 820, O-CU 830) and the RIC 810 may be virtualized on a cloud platform 840 (e.g., open chassis and blade-specification edge clouds) and configured in a device (e.g., a server). Such a scenario can support deployment in dense urban areas with abundant fronthaul capacity enabling baseband unit (BBU) functions pooled at a central location, with low latency enough to meet the O-DU latency requirements. According to an embodiment, it may not be necessary to attempt to centralize the RIC close to RT beyond the limit capable of centralizing the O-DU functionality. According to an embodiment, E2SM-RIC may be optimized for an O-RAN deployment scenario in which near-RT RIC, O-CU, and O-DU are implemented in an O-Cloud FIG. 9 illustrates examples of functional separations between a centralized unit (CU) 910 and a RIC 920.

Figure 9:
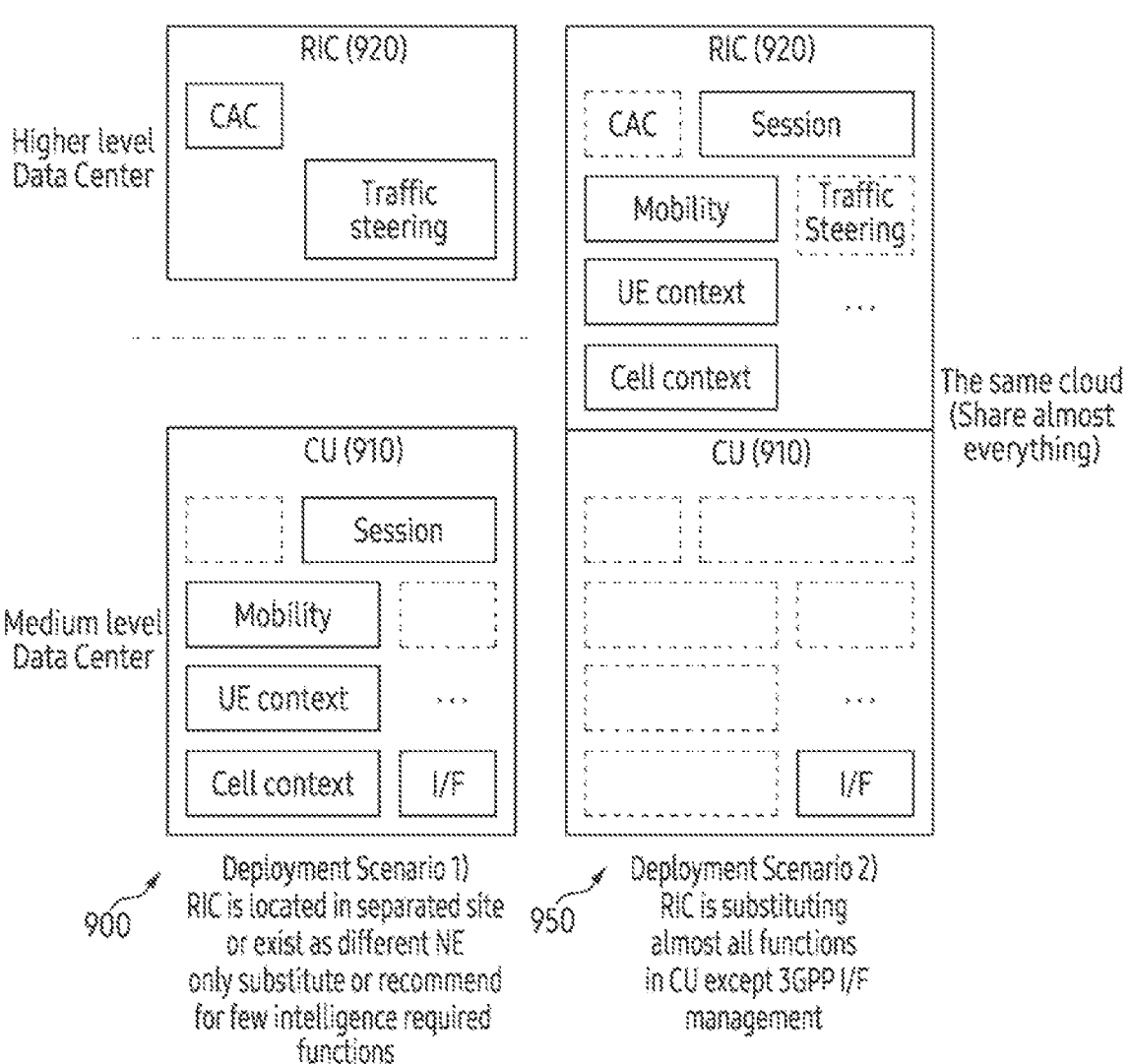
FIG. 9 illustrates examples of functional separation between a centralized unit (CU) and a RIC.

Referring to FIG. 9, the functional separations may be performed according to a deployment scenario #1 (example 900) or a functional deployment scenario #2 (example 950).

Deployment Scenario #1 (900): RIC is located at a separated site or exists only as a different Network Element (NE), and substitutes or recommends a few of intelligence required features (e.g., traffic steering, cell admission control (CAC)).

Deployment Scenario #2 (950): RIC can substitute almost all functions of CU except 3GPP I/F management (e.g., mobility function, session function, UE context function, cell context function). In deployment scenario #2 950, the RIC may be implemented as a CU-like device (e.g., a server device). For example, within the same cloud, the RIC may share all functions with the CU.

Although FIG. 9 illustrates two scenarios, other scenarios may be applied. For example, in the deployment scenario #1 (900), the mobility function may be performed by the RIC 920 rather than the CU 910. Further, for example, in the deployment scenario #1 (900), the UE context function may be performed by the RIC 920 and not the CU 910. Further, for example, in the deployment scenario #1 (900), the session setting function may be performed by the RIC 920, and not the CU 910.

Figure 10:
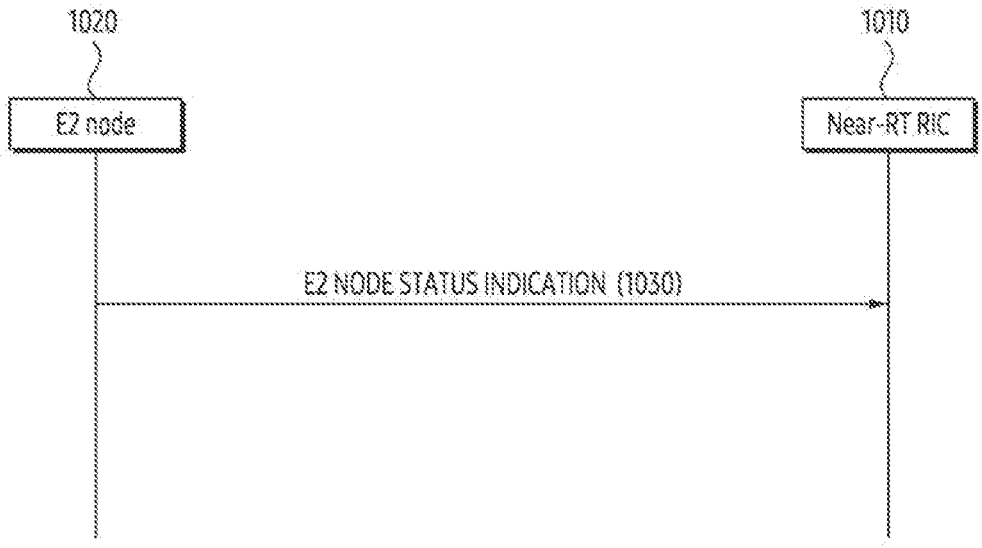
FIG. 10 illustrates an example of a status indication procedure of an E2 node according to embodiments.

FIG. 10 illustrates an example of a status indication procedure of an E2 node 1020 according to embodiments. The status indication procedure may be initiated by the E2 node in the E2AP. The E2 node 1020 of FIG. 10 exemplifies the E2 node (e.g., an E2 node 610) described through FIGS. 1 to 9. A Near-RT RIC 1010 of FIG. 10 exemplifies a RIC (e.g., a RIC 640) described through FIGS. 1 to 9.

Referring to FIG. 10, the E2 node 1020 may transmit a status indication message (e.g., an E2 NODE STATUS INDICATION message) to the Near-RT RIC 1010. The Near-RT RIC 1010 may receive a status indication message from the E2 node 1020. Overload may occur in the E2 node 1020. The E2 node 1020 may inform the Near-RT RIC 1010 of the load status of the E2 node 1020 through the status indication message. Through the status indication message, the Near-RT RIC 1010 may perform at least one overload reduction action (or overload reduction operation). For example, the Near-RT RIC 1010 may perform the at least one overload reduction action until it receives a status indication message notifying that the overload is resolved. For example, the status indication message may have a format as shown in the following table.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |

US 12,701,400 B2

17
18

TABLE 1-continued

| IE/Group Name | Presence | Range | IE type and reference | Semantics description | Criticality | Assigned Criticality |
|---|---|---|---|---|---|---|
| E2 Overload Information | M | | ENUMERATED (overloaded, not-overloaded) | | YES | reject |

The 'M' represents 'mandatory' and the 'O' represents 'optional'. The 'E2 Overload Information' information element (IE) may indicate whether the status of the E2 node is overloaded or not-overloaded.

In order to establish the E2 connection of the E2 interface between the E2 node 1020 and the Near-RT RIC 1010, an E2 setup procedure may be performed. In the E2 setup procedure, the E2 node 1020 may transmit an E2 SETUP REQUEST message to the Near-RT RIC 1010. The Near-RT RIC 1010 may transmit an E2 SETUP RESPONSE message to the E2 node 1020. The E2 SETUP REQUEST message of the E2 setup procedure may include RAN function IDs. The E2 SETUP REQUEST message may include a RAN Function Definition corresponding to the RAN function ID corresponding to each RAN function ID. The RAN Function Definition may include a description of the RAN function. The RAN function may be specific to the E2 service model. Thereafter, in the procedure, the RAN function may be indicated through the RAN function ID. After the E2 setup procedure, a subscription procedure may be performed to provide a service.

A RIC subscription procedure may be used to establish E2 subscriptions configured with an event trigger and a sequence of actions. A document titled 'O-RAN Working Group (WG) 3 Near-Real-time RAN Intelligent Controller Architecture & E2 General Aspects and Principles (E2GAP) standard' defines the Near-RT RIC 1010 as a service consumer and the E2 node 1020 as a service producer. The Near-RT RIC 1010 may perform the RIC subscription procedure to receive the service. The standard specifies that for the RIC subscription procedure, the Near-RT RIC 1010 transmits a RIC subscription request message to the E2 node 1020. The RIC subscription request message may include information about a RAN function. The E2 node 1020 may transmit a RIC subscription response message (e.g., a RIC SUBSCRIPTION RESPONSE message) to the Near-RT RIC 1010. If there is no error in the RIC subscription request message and the RAN function of the RIC subscription request message is supported, the E2 node 1020 may transmit a RIC subscription response message to the Near-RT RIC 1010.

By the subscription procedure described above, the Near-RT RIC 1010 may subscribe to the service provided by the E2 node 1020. The Near-RT RIC 1010 may subscribe to a service corresponding to the RAN function ID. For example, the Near-RT RIC 1010 may store multiple subscriptions corresponding to the RAN function ID. Each subscription may correspond to one RIC Request ID. The RIC Request ID is a local identifier used by Near-RT RIC 1010 to identify a specific RIC subscription procedure. For example, as the service producer, the E2 node 1020 may store information about three subscriptions (e.g., RIC Request ID 1, 2, 3) in the RAN function ID (e.g., RAN FUNCTION ID=1). The E2 node 1020 may perform one or more subscription procedures with the Near-RT RIC 1010. The Near-RT RIC 1010 may obtain information about three subscriptions (e.g., RIC Request ID 1, 2, 3) in the RAN function ID (e.g., RAN FUNCTION ID=1).

According to an embodiment, the status indication message may not simply indicate the overload of the E2 node 1020 as shown in Table 1, but may indicate the overload in units of RAN functions. For example, the status indication message may have the following format.

TABLE 2

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| Overload Information | M | | | | | |
| >RAN Functions Overloaded List | O | | | List of RAN Functions overloaded | | |
| >>RAN Function Item | | 1 ... <maxofRANfunctionID> | | | | |
| >>>RAN Function ID | O | | 9.2.8 | Id of the declared Function | | |
| >>>RAN Function Overload Information | O | | | ENUMERATED (overloaded, not-overloaded) | YES | reject |

The 'M' represents 'mandatory' and the 'O' represents 'optional'. The 'RAN Function Overload Information' information element (IE) may indicate whether the status of the RAN function corresponding to the 'RAN Function ID' is overloaded or not-overloaded.

According to an embodiment, the status indication message may indicate an overload in units of subscriptions. For example, the status indication message may have the following format.

TABLE 3

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| Overload Information | M | | | | | |
| >Subscription Overloaded List | O | | | | | |
| >>RIC Request ID | O | | 9.2.7 | | YES | reject |
| >>Subscription Overload information | O | | ENUMERATED (overloaded, not-overloaded) | | YES | reject |

The 'M' represents 'mandatory' and the 'O' represents 'optional'. The 'Subscription Overload information' information element (IE) may indicate whether the status of the subscription corresponding to 'RIC Request ID' is overloaded or not-overloaded.

According to an embodiment, the status indication message may indicate the overload for at least one of the E2 node 1020, RAN function, and subscription. For example, the status indication message may have the following format.

TABLE 4

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| Overload Information | M | | | | | |
| >E2 Node | | | | | | |
| >>E2 Overload Information | O | | ENUMERATED (overloaded, not-overloaded) | | YES | reject |
| >RAN Functions Overloaded List | O | | | List of RAN Functions overloaded | | |
| >>RAN Function Item | | 1 ... <maxofRANfunctionID> | | | | |
| >>>RAN Function ID | O | | 9.2.8 | Id of the declared Function | | |
| >>> RAN Function Overload Information | O | | ENUMERATED (overloaded, not-overloaded) | | YES | reject |
| >Subscription Overloaded List | O | | | | | |
| >>RIC Request ID | O | | 9.2.7 | | YES | reject |
| >>Subscription Overload | O | | ENUMERATED (overloaded, | | YES | reject |

TABLE 4-continued

| IE/Group Name | Presence | Range | IE type and reference | Semantics description | Criticality | Assigned Criticality |
|---|---|---|---|---|---|---|
| information | | | not-overloaded) | | | |

The 'M' represents 'mandatory' and the 'O' represents 'optional'. For the description of each IE, the descriptions of Tables 1 to 3 may be referred.

An overload control operation according to the status indication message of the E2 node described through FIG. 10 may be performed. For example, the overload reduction action for the status indication message may include deletion of the RIC subscription corresponding to the RAN function. A RIC subscription delete procedure may be performed. In addition, for example, the overload reduction action for the status indication message may include E2 NODE REMOVAL. An E2 node removal procedure may be performed. Examples of the overload control operation are described through FIGS. 14A to 14C.

Figure 11:
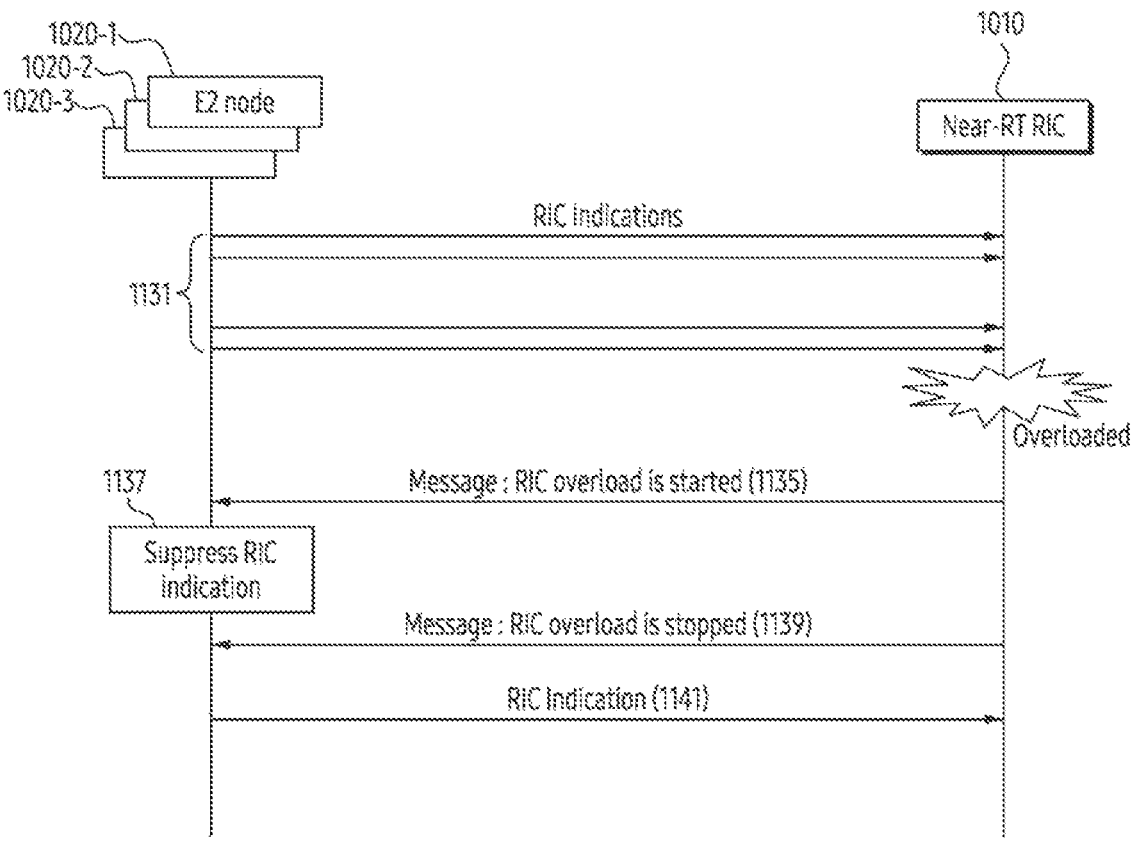
FIG. 11 illustrates an example of overload control of a Near-RT RIC according to embodiments.

FIG. 11 illustrates an example of overload control of a Near-RT RIC according to embodiments. E2 nodes 1020-1, 1020-2, . . . , 1020-3 in FIG. 11 exemplify the E2 nodes (e.g., an E2 node 610) described through FIGS. 1 to 9. A Near-RT RIC 1010 in FIG. 11 exemplifies a RIC (e.g., a RIC 640) described through FIGS. 1 to 9. Descriptions of a setup procedure between the E2 node and the Near-RT RIC, a subscription procedure between the E2 node and the Near-RT RIC, and a RAN function described in FIG. 10 may be equally applied to FIG. 11.

Referring to FIG. 11, in operation 1131, the Near-RT RIC 1010 may receive RIC indications from E2 nodes (e.g., the E2 node 1020-1, the E2 node 1020-2, the E2 node 1020-3, . . . ). The RIC indications may include RIC indication messages. For example, the RIC indication message may correspond to a service subscribed by the Near-RT RIC 1010.

In operation 1133, the Near-RT RIC 1010 may identify an overload of the Near-RT RIC 1010. For example, as the number of E2 nodes to which the Near-RT RIC 1010 is subscribed increases, an overload may occur in the Near-RT RIC 1010. For example, in case that excessive RIC indication messages from E2 nodes flock to the Near-RT RIC 1010, the overload may occur in the Near-RT RIC 1010. For example, suppose a situation in which a service is subscribed to report a UE ID for each event. In case that the amount of movement of users increases rapidly in a specific area (e.g., marathon, fireworks), the number of UEs which is subject of monitoring may suddenly increase. As a result, the RIC indication messages transmitted to the Near-RT RIC 1010 may increase rapidly, and the usage of the central processing unit (CPU) of the Near-RT RIC 1010 may increase. An overload situation may occur in the Near-RT RIC 1010.

For the RIC indication message exceeding the processing threshold of the Near-RT RIC 1010, the Near-RT RIC 1010 may drop or ignore the RIC indication message. However, since the RIC indication message uses resources (e.g., E2 interface bandwidth) between the Near-RT RIC 1010 and the E2 node, unnecessary resources are consumed. Due to wasted resources, resource inefficiency is caused. A method of modifying or deleting the subscription to the RAN function that triggers excessive RIC indication messages may be used. However, since the modification or deletion of the subscription is performed through a 2-way handshaking method, it is not suitable for resolving the overload situation. For example, since processing of additional received messages (e.g., subscription delete response message of subscription delete procedure) is required in the Near-RT RIC 1010, the received messages may act as an additional burden in the overload situation. Thus, in the present disclosure, a message for notifying the E2 node of a status (e.g., overload, non-overload) related to the load of the Near-RT RIC 1010 may be used.

In operation 1135, the Near-RT RIC 1010 may transmit a first message for notifying the overload of the Near-RT RIC 1010 to at least one E2 node. The first message may indicate overload of the Near-RT RIC 1010. For example, the Near-RT RIC 1010 may identify the at least one E2 node (e.g., the E2 node 1020-1) among a plurality of E2 nodes connected to the Near-RT RIC 1010. The Near-RT RIC 1010 may transmit the first message to the at least one E2 node. In addition, for example, the Near-RT RIC 1010 may transmit the first message to each E2 node of a plurality of E2 nodes connected to the Near-RT RIC 1010.

In operation 1137, the E2 node may suppress transmission of the RIC indication message. The E2 node means a node that received the first message among a plurality of E2 nodes connected to the Near-RT RIC 1010. The E2 node may stop signaling with the Near-RT RIC 1010 to resolve overload of the Near-RT RIC 1010.

In operation 1139, the Near-RT RIC 1010 may transmit a second message for notifying that the overload of the Near-RT RIC 1010 has been stopped, to the E2 node. The second message may indicate that the overload of the Near-RT RIC 1010 is stopped. The E2 node means a node that received the first message among a plurality of E2 nodes connected to the Near-RT RIC 1010. For example, the E2 node may include the E2 node 1020-1. The E2 node 1020-1 that has received the second message may identify that the overload of the Near-RT RIC 1010 is resolved.

In operation 1141, the E2 node 1020-1 may transmit the RIC indication message to the Near-RT RIC 1010. As the overload of the Near-RT RIC 1010 is resolved, the E2 node 1020-1 may transmit the RIC indication message to the Near-RT RIC 1010 again.

In order to configure the first message and the second message described in FIG. 11, various message formats may be defined. For example, in FIGS. 12A to 12B, an example in which the first message and the second message are configured by messages including different information within the same message format is described. In addition, for example, in FIG. 13 an example in which the first message and the second message are configured by messages having different message formats is describes.

Figure 12A:
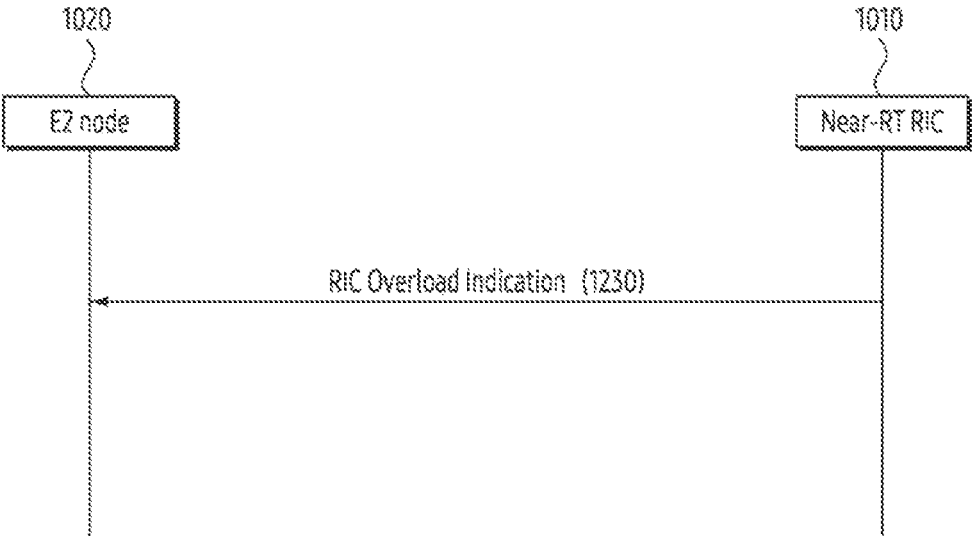
FIGS. 12A to 12B illustrate an example of an overload control procedure according to an embodiment.
Figure 12B:
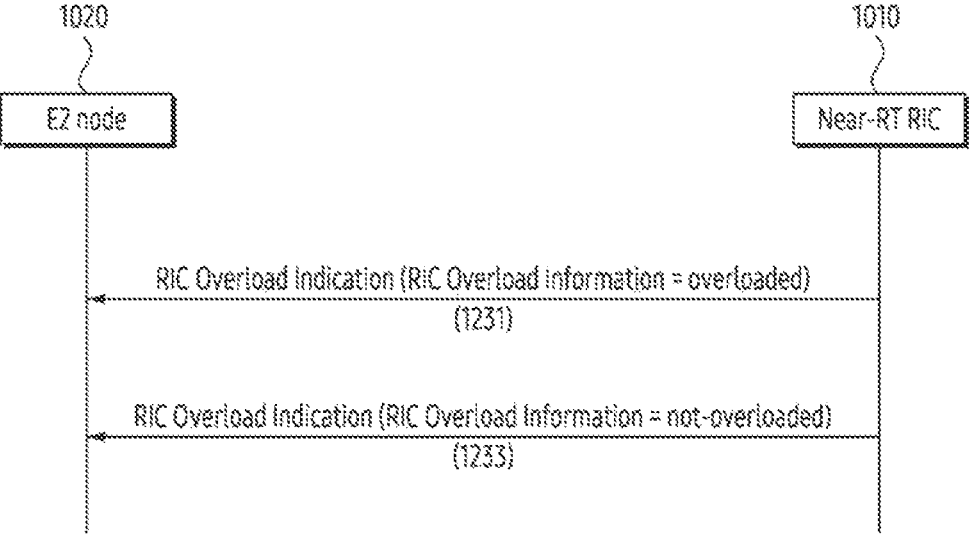

FIGS. 12A to 12B illustrate an example of an overload control procedure according to an embodiment.

Referring to FIG. 12A, a Near-RT RIC 1010 may transmit a RIC Overload indication message to an E2 node 1020. The E2 node 1020 may receive the RIC Overload indication message from the Near-RT RIC 1010. For example, the RIC Overload indication message may have the following format:

TABLE 5

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| RIC Overload Information | O | | ENUMERATED (overloaded, not-overloaded) | | | |

The 'M' represents 'mandatory' and the 'O' represents 'optional'. The 'RIC Overload Information' Information Element (IE) may indicate whether the status of the Near-RT RIC is overloaded or not-overloaded.

According to an embodiment, the RIC Overload indication message may not simply indicate the overload of the Near-RT RIC 1010 as shown in Table 5, but may indicate the overload in units of RAN functions. For example, the RIC Overload indication message may have the following format.

TABLE 6

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| Overload Control RAN Function List | | 0 . . . 1 | | | YES | Reject |
| >Overload Control RAN Function Item | | 1 . . . <maxofRANfunctionID> | | | — | |
| >>RAN Function ID | O | | 9.2.8 | Id of the declared Function | | |
| >>RAN Function Overload information | O | | ENUMERATED (overloaded, not-overloaded) | | | |

The 'M' represents 'mandatory' and the 'O' represents 'optional'. The 'RAN Function Overload Information' information element (IE) may indicate whether the status of the RAN function corresponding to the 'RAN Function ID' is overloaded or not-overloaded.

According to an embodiment, the RIC Overload indication message may indicate the overload in units of subscriptions. For example, the RIC Overload indication message may have the following format.

TABLE 7

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| Overload Control Subscription List | | 0 . . . 1 | | | YES | Reject |

TABLE 7-continued

| IE/Group Name | Presence | Range | IE type and reference | Semantics description | Criticality | Assigned Criticality |
|---|---|---|---|---|---|---|
| >Overload Control Subscription Item | | 1 . . . <maxofSubscriptionID> | | | | — |
| >>RIC Request ID | O | | 9.2.7 | Subscription ID | | |
| >>Subscription Overload information | O | | ENUMERATED (overloaded, not-overloaded) | | | |

The 'M' represents 'mandatory' and the 'O' represents 'optional'. The 'Subscription Overload information' information element (IE) may indicate whether the status of the subscription corresponding to 'RIC Request ID' is overloaded or not-overloaded.

According to an embodiment, the RIC Overload indication message may indicate overload for at least one of the Near-RT RIC 1010, the RAN function, and the subscription. For example, the RIC Overload indication message may have the following format.

TABLE 8

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| RIC Overload Information | O | | ENUMERATED (overloaded, not-overloaded) | | | |
| Overload Control RAN Function List | | 0 . . . 1 | | | YES | Reject |
| >Overload Control RAN Function Item | | 1 . . . <maxofRANfunctionID> | | | | — |
| >>RAN Function ID | O | | 9.2.8 | Id of the declared Function | | |
| >>RAN Function Overload information | O | | ENUMERATED (overloaded, not-overloaded) | | | |
| Overload Control Subscription List | | 0 . . . 1 | | | YES | Reject |
| >Overload Control Subscription Item | | 1 . . . <maxofSubscriptionID> | | | | — |
| >>RIC Request ID | O | | 9.2.7 | Subscription ID | | |
| >>Subscription Overload information | O | | ENUMERATED (overloaded, not-overloaded) | | | |

The 'M' represents 'mandatory' and the 'O' represents 'optional'. For the description of each IE, the descriptions of Tables 5 to 7 may be referred.

Referring to FIG. 12B, in operation 1231, the Near-RT RIC 1010 may transmit a RIC Overload indication message including information indicating that the status of the Near-RT RIC 1010 is overloaded to the E2 node 1020. The RIC Overload indication message exemplifies a first message in operation 1135 of FIG. 11. For example, the 'RIC Overload Information' IE of the RIC Overload indication message may be set to 'overloaded'. For example, the E2 node 1020 may be configured to refrain from operating (e.g., transmitting the RIC indication message) according to subscription until it receives the RIC Overload indication message notifying that the overload is resolved (reference form). In addition, for example, the E2 node 1020 may suspend operations according to subscription until it receives the RIC Overload indication message notifying that the overload is resolved.

In operation 1233, the Near-RT RIC 1010 may transmit the RIC Overload indication message including information indicating that the status of the Near-RT RIC 1010 is not-overloaded to the E2 node 1020. The RIC Overload indication message exemplifies a second message in operation 1139 of FIG. 11. For example, the 'RIC Overload Information' IE of the RIC Overload indication message may be set to 'not-overloaded'. The E2 node 1020 may resume an operation (e.g., transmitting the RIC indication message) according to subscription based on the RIC Overload indication message notifying that the overload is resolved. The E2 node 1020 is an operation according to the subscription and may transmit the RIC indication message to the Near-RT RIC 1010.

In FIG. 12B, the RIC Overload indication message indicating whether the status of the Near-RT RIC 1010 is overloaded or not is described, but embodiments of the present disclosure are not limited thereto. For example, according to Tables 6 to 8, the Near-RT RIC 1010 may notify the E2 node 1020 of whether it is overloaded or not, for each subscription or for each RAN function.

According to an embodiment, in order to notify overload of a specific RAN function, the Near-RT RIC 1010 may transmit the RIC Overload indication message including overload information corresponding to the specific RAN function to the E2 node 1020. For example, the overload information corresponds to the 'RAN Function ID' IE in Table 6 and may include 'RAN Function Overload information' IE set to 'overloaded'. Thereafter, when the overload on the specific RAN function is resolved, the Near-RT RIC 1010 may transmit the RIC Overload indication message including information indicating that the specific RAN function is not-overloaded to the E2 node 1020. The Near-RT RIC 1010 may notify the E2 node 1020 of the overload status in units of RAN functions.

According to an embodiment, in order to notify an overload of a specific subscription, the Near-RT RIC 1010 may transmit the RIC Overload indication message including overload information corresponding to identification information (e.g., 'RIC Request ID' of Table 7) of the specific subscription, to the E2 node 1020. For example, the overload information corresponds to the 'RAN Function ID' IE of Table 7 and may include 'Subscription Overload information' IE set to 'Overloaded'. Thereafter, when the overload on the subscription is resolved, the Near-RT RIC 1010 may transmit the RIC Overload indication message including information indicating that the subscription is not-overloaded, to the E2 node 1020. The Near-RT RIC 1010 may notify the E2 node 1020 of the overload status for each subscribed service.

Figure 13:
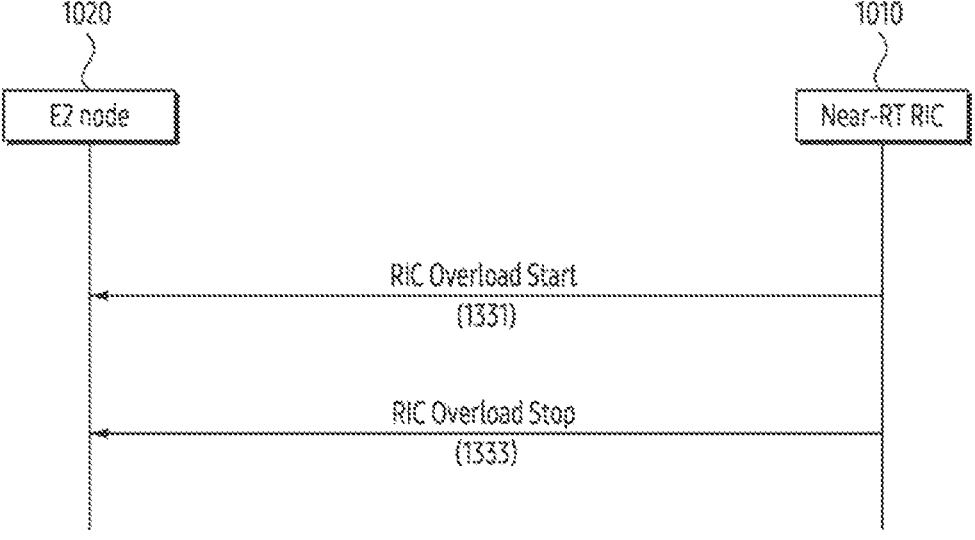
FIG. 13 illustrates another example of an overload control procedure according to an embodiment.

FIG. 13 illustrates another example of an overload control procedure according to an embodiment.

Referring to FIG. 13, in operation 1331, a Near-RT RIC 1010 may transmit a RIC overload start message to the E2 node 1020. The RIC overload start message may be used to reduce the signaling load from the E2 node 1020 toward the Near-RT RIC 1010. The RIC overload start message may notify the E2 node 1020 of the overload of the Near-RT RIC 1010. The E2 node 1020 receiving the overload start message may identify that the Near-RT RIC 1010 is in an overloaded status. The overload start message illustrates a first message of operation 1135 of FIG. 11.

In operation 1333, the Near-RT RIC 1010 may transmit a RIC overload stop message to the E2 node 1020. The RIC overload stop message may be used to notify the E2 node 1020 that the overload situation had ended in the Near-RT RIC 1010 and normal operation is resumed. The E2 node 1020 receiving the overload stop message may identify that the overload status of the Near-RT RIC 1010 has ended and the normal operation for traffic to the Near-RT RIC 1010 has resumed. The overload stop message illustrates a second message of operation 1139 of FIG. 11.

The RIC overload start message may notify that the Near-RT RIC 1010 is in the overloaded status. The RIC overload start message may indicate that the Near-RT RIC 1010 is in the overloaded status just by the format of the message. It may not include any other information other than the message type (e.g., 'Message Type' IE) and transaction identifier (e.g., 'Transaction ID' IE). For example, the RIC overload start message may have the following format.

TABLE 9

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |

The 'M' represents 'mandatory' and the 'O' represents 'optional'.

The RIC overload stop message may indicate that the overload status ends. The RIC overload stop message may have a format corresponding to the RIC overload start message. For example, the RIC overload stop message may have the following format.

TABLE 10

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |

The 'M' represents 'mandatory' and the 'O' represents 'optional'. For the description of each IE, the descriptions of Tables 5 to 7 may be referred.

Meanwhile, the overload status may be indicated for each RAN function or for each subscription. To this end, the format of the overload start message may be changed. For example, the RIC overload start message may have the following format.

TABLE 11

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| Overload Start RAN Function List | | 0 . . . 1 | | | YES | Reject |
| >Overload Start RAN Function Item | | 1 . . . <maxofRANfunctionID> | | | — | |
| >>RAN Function ID | O | | 9.2.8 | Id of the declared Function | | |
| Overload Start Subscription List | | 0 . . . 1 | | | YES | Reject |
| >Overload Start Subscription Item | | 1 . . . <maxofSubscriptionID> | | | — | |
| >>RIC Request ID | O | | 9.2.7 | Subscription ID | | |

The 'M' represents 'mandatory' and the 'O' represents 'optional'. The 'Overload Start RAN Function List' IE may indicate one or more RAN functions corresponding to the overload status. The 'Overload Start RAN Function List' IE may include identification information (e.g., RAN Function ID) of each RAN function of the one or more RAN functions. In the same way, the 'Overload Start Subscription List' IE may indicate one or more subscriptions corresponding to the overload status. The 'Overload Start RAN Function List' IE may include identification information (e.g., RIC Request ID) of each subscription of the one or more subscriptions.

The RIC overload stop message may have a format corresponding to the RIC overload start message. For example, the RIC overload stop message may have the following format.

TABLE 12

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| Overload Stop RAN Function List | | 0 . . . 1 | | | YES | Reject |
| >Overload Stop RAN Function Item | | 1 . . . <maxofRANfunctionID> | | | — | |
| >>RAN Function ID | O | | 9.2.8 | Id of the declared Function | | |
| Overload Stop Subscription List | | 0 . . . 1 | | | YES | Reject |
| >Overload Stop Subscription Item | | 1 . . . <maxofSubscriptionID> | | | — | |
| >>RIC Request ID | O | | 9.2.7 | Subscription ID | | |

The 'M' represents 'mandatory' and the 'O' represents 'optional'. The 'Overload Stop RAN Function List' IE may indicate one or more RAN functions whose overload status has ended. The 'Overload Stop RAN Function List' IE may include the identification information (e.g., RAN Function ID) of each RAN function of the one or more RAN functions. In the same way, the 'Overload Stop Subscription List' IE may indicate one or more subscriptions whose overload status has ended. The 'Overload Start RAN Function List' IE may include the identification information (e.g., RIC Request ID) of each subscription of the one or more subscriptions.

The RIC overload start message is described in Table 9 and Table 11. According to an additional embodiment, the RIC overload start message may not only notify the overload status, but may further include information for controlling the E2 node to resolve overload. According to an embodiment, the RIC overload start message may include action information for the E2 node 1020. For example, the action information may indicate signaling traffic related to rejection (or ceasing/stopping of signaling of a subscribed RIC subscription or actions within the subscribed RIC subscription) by the E2 node 1020 in the overload situation of the Near-RT RIC 1010. In addition, according to an embodiment, the RIC overload start message may further include probability information. The probability information may indicate a rejection ratio (or stopping rate of the signaling) for the signaling traffic indicated by the action information. For example, the action information and the probability information may be included in the RIC overload start message. For another example, the action information and the probability information may be included in the RIC overload start message in units of RAN functions or in units of RIC subscriptions.

Figure 14A:
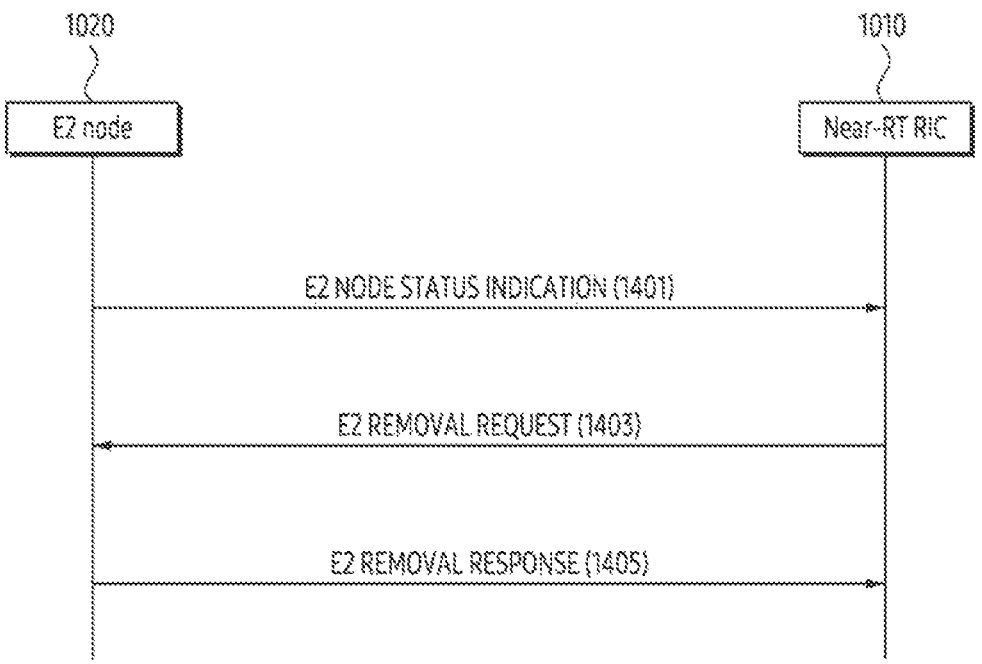
FIGS. 14A to 14C illustrate examples of an overload resolution procedure of an E2 node according to embodiments.
Figure 14B:
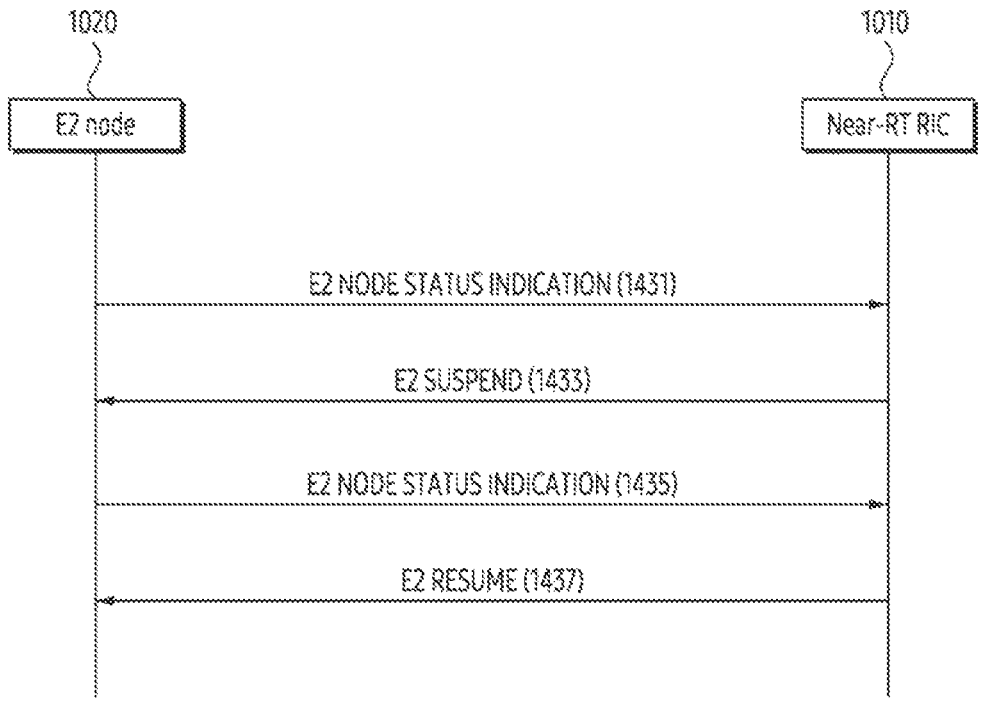
Figure 14C:
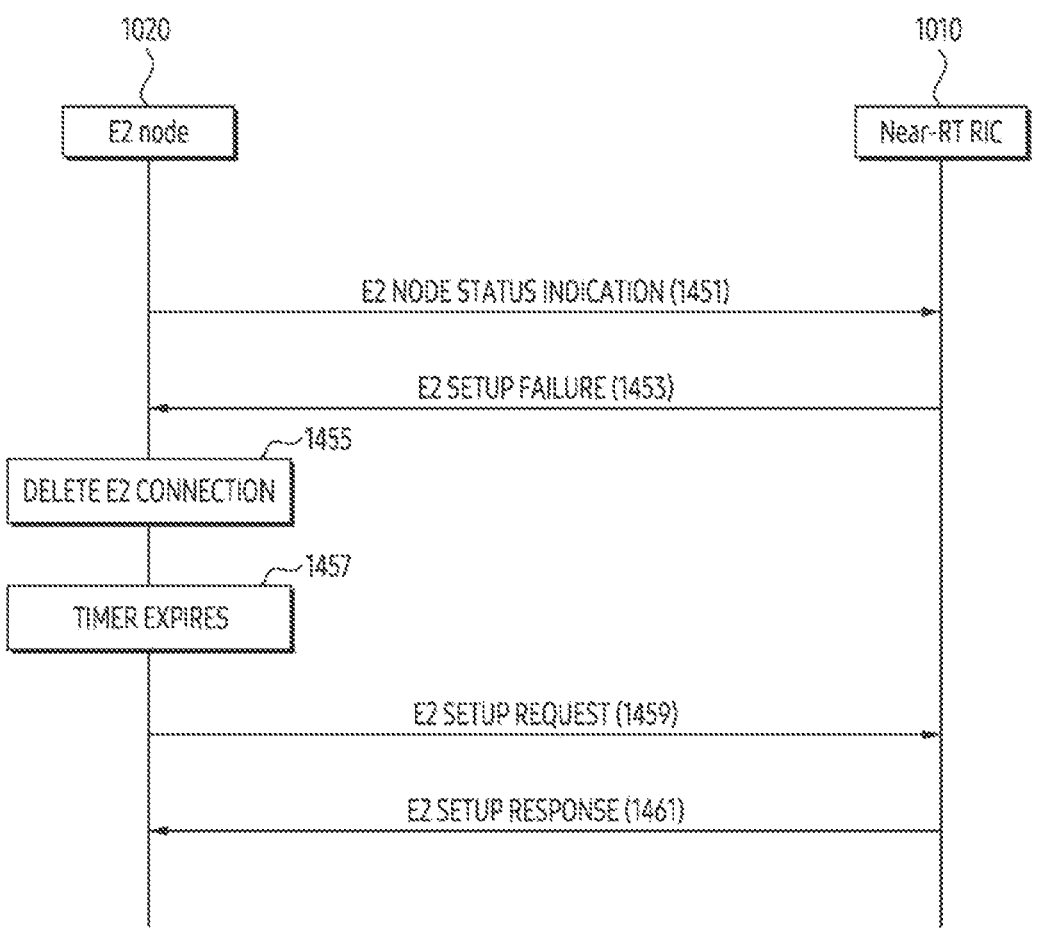

FIGS. 14A to 14C illustrate examples of an overload resolution procedure of an E2 node according to embodiments.

Referring to FIG. 14A, in operation 1401, an E2 node 1020 may transmit a status indication message to a Near-RT RIC 1010. For example, the status indication message may have one format among Tables 1 to 4. The status indication message may indicate that the E2 node 1020 is in an overloaded status.

In operation 1403, the Near-RT RIC 1010 may transmit an E2 removal request message to the E2 node 1020. The Near-RT RIC 1010 may identify that the E2 node 1020 is in the overloaded status. The Near-RT RIC 1010 may initiate an E2 removal procedure to resolve the overload of the E2 node 1020. The purpose of the E2 removal procedure is to remove the E2 signal connection between the Near-RT RIC 1010 and the E2 node 1020 in a controlled manner. According to the E2 removal procedure, existing application level configuration data may be deleted from the Near-RT RIC 1010 and the E2 node 1020.

In operation 1405, the E2 node 1020 may transmit an E2 removal response message to the Near-RT RIC 1010. The Near-RT RIC 1010 may initiate the procedure by transmitting the E2 removal request message. The E2 node 1020 that has received the E2 removal request message may respond to the E2 removal request message by using the E2 removal response message. After receiving the E2 removal response message, the Near-RT RIC 1010 may start removing the transport network layer (TNL) connection to the E2 node 1020. The Near-RT RIC 1010 may remove all resources related to the E2 signal connection. The E2 node 1020 may remove all resources related to the E2 signal connection.

As the E2 signal connection is removed, the overload status of the E2 node 1020 may be resolved. In case that the overload is resolved or a certain period of time has elapsed, according to the determination of the E2 node 1020, the E2 node 1020 may perform the E2 setup procedure. Through the E2 setup procedure, the E2 connection and service between the E2 node 1020 and the Near-RT RIC 1010 may be provided again.

Referring to FIG. 14B, in operation 1431, the E2 node 1020 may transmit the status indication message to the Near-RT RIC 1010. For example, the status indication message may have one format among Tables 1 to 4. The status indication message may indicate that the E2 node 1020 is in the overloaded status.

In operation 1433, the Near-RT RIC 1010 may transmit an E2 suspend message to the E2 node 1020. The E2 suspend message may indicate identification information of the E2 node and the service unit (e.g., RIC subscription, RAN function, or entire E2 node) for which suspend is required in the E2 node. For example, based on the E2 suspend message, the E2 node 1020 may suspend the E2 connection for a certain period of time. In addition, for example, based on the E2 suspend message, the E2 node 1020 may suspend the service according to the corresponding RIC subscription. In addition, for example, based on the E2 suspend message, the E2 node 1020 may suspend services according to all RIC subscriptions corresponding to the RIC function. The E2 node 1020 may perform operation 1435 based on identifying that the overload is resolved.

In operation 1435, the E2 node 1020 may transmit the status indication message to the Near-RT RIC 1010. For example, the status indication message may have one format among Tables 1 to 4. The status indication message may indicate that the E2 node 1020 is not in the overload status. The Near-RT RIC 1010 may identify that the overload status of the E2 node 1020 is resolved based on the status indication message.

In operation 1437, the Near-RT RIC 1010 may transmit an E2 resume message to the E2 node 1020. The E2 resume message may indicate the identification information of the E2 node and the service unit (e.g., RIC subscription, RAN function, or entire E2 node) for which suspend is required in the E2 node. For example, based on the E2 resume message, the E2 node 1020 may resume the E2 connection for the certain period of time. The E2 node 1020 may recover the existing E2 connection. In addition, for example, based on the E2 suspend message, the E2 node 1020 may resume the service according to the corresponding RIC subscription. In addition, for example, based on the E2 suspend message, the E2 node 1020 may resume services corresponding to all suspended RIC subscriptions.

Referring to FIG. 14C, in operation 1451, the E2 node 1020 may transmit the status indication message to the Near-RT RIC 1010. For example, the status indication message may have one format among Tables 1 to 4. The status indication message may indicate that the E2 node 1020 is in the overloaded status.

In operation 1453, the Near-RT RIC 1010 may transmit an E2 setup failure message to the E2 node 1020. The E2 setup failure message may include timer information. For example, the E2 setup failure message may include a 'Time To Wait' IE. The 'Time To Wait' IE may indicate a minimum allowed waiting time. The waiting time may be one of 1 second, 2 seconds, 5 seconds, 10 seconds, 20 seconds, or 60 seconds. There is no timer for re-performing the E2 setup in the E2 removal procedure, but since the E2 setup failure message includes the timer information, the E2 setup failure message may be used. The E2 setup failure message may be referred to as a duplicated E2 setup failure. The E2 node 1020 may identify the timer information.

In operation 1455, the E2 node 1020 may delete the E2 connection. The E2 node 1020 may set the timer of the timer information. The E2 node 1020 shall wait for a period of time according to the timer before restarting the E2 setup procedure toward the Near-RT RIC 1010.

In operation 1457, the E2 node 1020 may identify the expiration of the timer. The E2 node 1020 may delete the E2 setup, in case of receiving the E2 setup failure message from the Near-RT RIC 1010 in which the E2 connection is already established. The E2 node 1020 may not transmit the E2 setup request message during a time corresponding to the timer. Thereafter, when the timer expires, the E2 node 1020 may identify the status of the E2 node 1020. Based on identifying that the E2 node 1020 is not in the overload status, the E2 node 1020 may initiate the E2 setup procedure. In other words, based on information on the timer included in the E2 setup failure message, a time for resolving the overload status of the E2 node 1020 may be set.

In operation 1455, the E2 node 1020 may transmit the E2 setup request message to the Near-RT RIC 1010.

In operation 1457, the Near-RT RIC 1010 may transmit an E2 setup response message to the E2 node 1020.

Figure 15A:
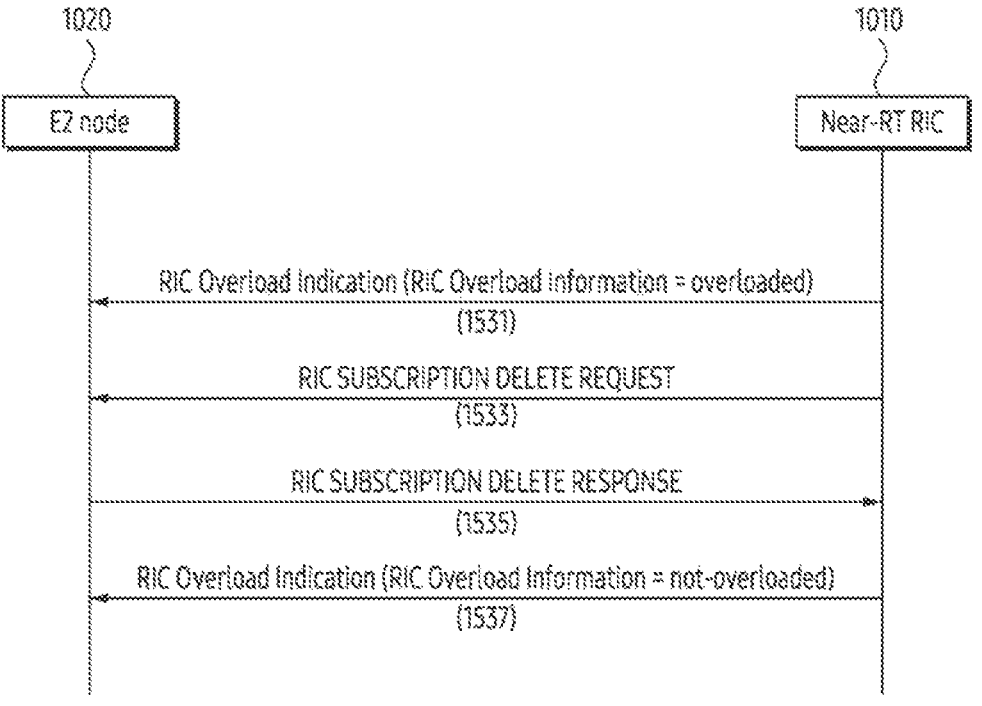
FIGS. 15A to 15B illustrate examples of an overload resolution procedure of a Near-RT RIC according to embodiments.
Figure 15B:
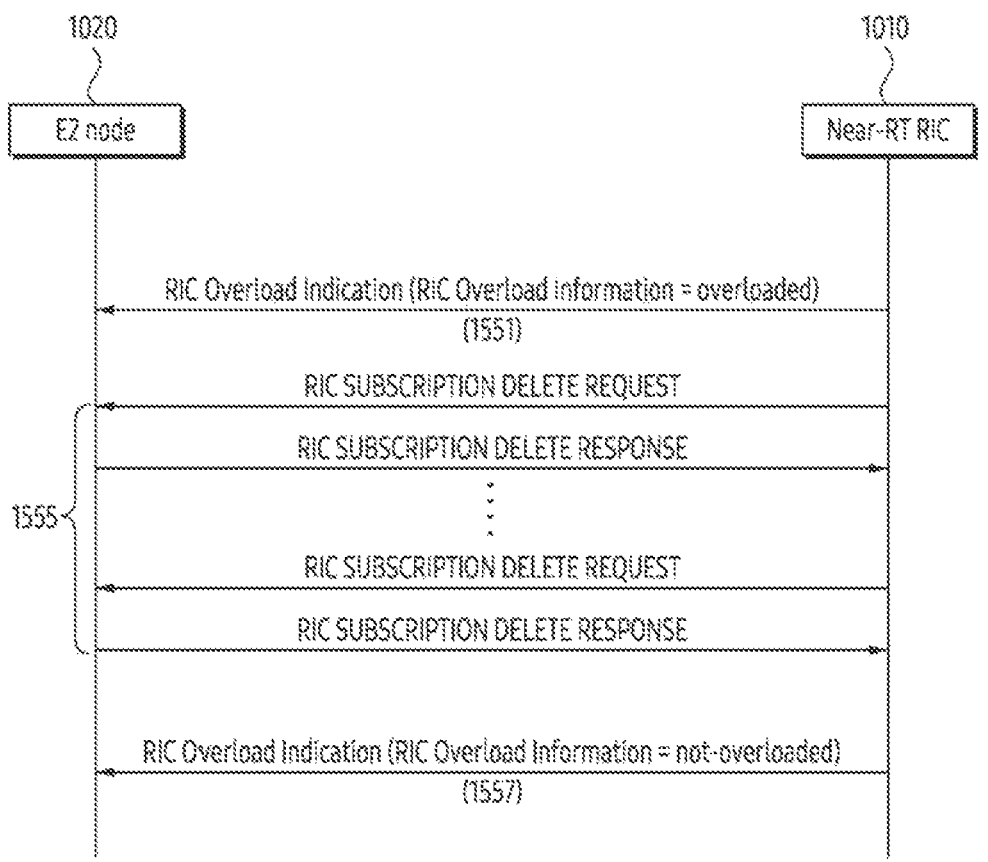

FIGS. 15A to 15B illustrate examples of an overload resolution procedure of a near-RT RIC according to embodiments.

Referring to FIG. 15A, in operation 1531, the Near-RT RIC 1010 may transmit a RIC overload indication message to the E2 node 1020. The RIC overload indication message may include information indicating that the Near-RT RIC 1010 is in an overloaded status. For example, the RIC overload indication message may have the format of Tables 5 to 8. The RIC overload indication message may indicate, for example, that the Near-RT RIC 1010 is in the overloaded status. In addition, for example, the information may indicate that a RIC subscription to which the Near-RT RIC 1010 is subscribed is in the overloaded status. In addition, for example, it may indicate that the RAN function used by the Near-RT RIC 1010 is in the overloaded status.

In operation 1533, the Near-RT RIC 1010 may transmit a RIC subscription delete request message to the E2 node 1020. In order to resolve the overloaded status, the Near-RT RIC 1010 may initiate a RIC subscription delete procedure. The Near-RT RIC 1010 may perform an overload reduction action in units of RIC subscriptions. The Near-RT RIC 1010 may identify the RIC subscription corresponding to the overloaded status. The Near-RT RIC 1010 may identify identification information (e.g., 'RIC Request ID' IE) corresponding to the RIC subscription. The Near-RT RIC 1010 may generate the RIC subscription delete request message including the identification information. The Near-RT RIC 1010 may transmit the generated RIC subscription delete request message to the E2 node 1020. For example, the RIC subscription delete request message may have the following format.

TABLE 13

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |
| RAN Function ID | M | | 9.2.8 | | YES | reject |

In operation 1535, the E2 node 1020 may transmit a RIC subscription delete response message to the Near-RT RIC 1010. The RIC subscription delete response message may be transmitted by accepting the request of the Near-RT RIC 1010 in the E2 node 1020. The RIC subscription delete response message may be transmitted from the E2 node 1020 to delete the existing subscription from the E2 node 1020. For example, the RIC subscription delete response message may have the following format.

TABLE 14

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |
| RAN Function ID | M | | 9.2.8 | | YES | reject |

In operation 1537, the Near-RT RIC 1010 may transmit the RIC overload indication message to the E2 node 1020. The RIC overload indication message may include information indicating that the Near-RT RIC 1010 is not-overloaded. For example, the RIC overload indication message may have the format of Tables 5 to 8. In the RIC overload indication message, for example, the information may indicate that the Near-RT RIC 1010 is not-overloaded. In addition, for example, the information may indicate that the RIC subscription to which Near-RT RIC 1010 is subscribed is not-overloaded. In addition, for example, it may indicate that the RAN function used by the Near-RT RIC 1010 is not-overloaded.

Although the RIC overload indication message is described as an example in FIG. 15A, embodiments of the present disclosure are not limited thereto. According to an embodiment, instead of the RIC overload indication message of operation 1531, the RIC overload start message of FIG. 13 may be used. In addition, instead of the RIC overload indication message of operation 1535, the RIC overload stop message of FIG. 13 may be used.

Referring to FIG. 15B, in operation 1551, the Near-RT RIC 1010 may transmit the RIC overload indication message to the E2 node 1020. The RIC overload indication message may include information indicating that the Near-RT RIC 1010 is in the overloaded status. For example, the RIC overload indication message may have the format of Tables 5 to 8. In the RIC overload indication message, for example, the information may indicate that the Near-RT RIC 1010 is in the overloaded status. In addition, for example, the information may indicate that the RIC subscription to which the Near-RT RIC 1010 is subscribed is in the overloaded status. In addition, for example, it may indicate that the RAN function used by the Near-RT RIC 1010 is in the overloaded status.

In operation 1555, the Near-RT RIC 1010 and the E2 node 1020 may perform RIC subscription delete procedures on the E2 node 1020. The Near-RT RIC 1010 may perform the overload reduction action in units of RAN functions, instead of performing the overload reduction action in units of RIC subscriptions. In order to resolve the overloaded status, the Near-RT RIC 1010 may initiate the RIC subscription delete procedure. The Near-RT RIC 1010 may identify RIC subscriptions corresponding to the RAN function to be removed. The Near-RT RIC 1010 may perform the RIC subscription delete procedure for each RIC subscription of the RIC subscriptions. For example, suppose a situation in which the 'RIC Request ID' IE of the RIC subscriptions corresponding to the RAN function ID having a value of '1' are 1, 2, and 3, respectively. The Near-RT RIC 1010 may perform three RIC subscription delete procedures, in order to delete RIC subscriptions according to the RAN function ID. The RIC subscription delete request messages according to the format of Table 13 may be transmitted to the E2 node 1020.

In operation 1557, the Near-RT RIC 1010 may transmit the RIC overload indication message to the E2 node 1020. The RIC overload indication message may include information indicating that Near-RT RIC 1010 is not-overloaded. For example, the RIC overload indication message may have the format of Tables 5 to 8. In the RIC overload indication message, for example, the information may indicate that the Near-RT RIC 1010 is not-overloaded. In addition, for example, the information may indicate that the RIC subscription to which Near-RT RIC 1010 is subscribed is not-overloaded. In addition, for example, it may indicate that the RAN function used by the Near-RT RIC 1010 is not-overloaded.

Although the RIC overload indication message is described as an example in FIG. 15B, embodiments of the present disclosure are not limited thereto. According to an embodiment, instead of the RIC overload indication message of operation 1551, the RIC overload start message of FIG. 13 may be used. In addition, instead of the RIC overload indication message of operation 1557, the RIC overload stop message of FIG. 13 may be used.

According to the embodiments of the present disclosure, the device and the method may reduce unnecessary signaling traffic between the two nodes and reduce the processing burden on each node, by notifying a radio access network (RAN) intelligent controller (RIC) (e.g., the Near-RT RIC 1010) of the load status of the Near-RT RIC 1010 to the E2 node (e.g., the E2 node 1020), in a wireless communication system. In case that the subscription service or RAN function registered in the subscription manager of the Near-RT RIC 1010 requires too many resources, the Near-RT RIC 1010 may set to refrain from additional signaling (e.g., RIC Indication) to the E2 node 1020 through the overload indication message (or overload start message). Thereafter, according to the overload reduction action, when the overload status of the Near-RT RIC 1010 is resolved, the Near-RT RIC 1010 may notify the E2 node 1020 that the overload status is resolved, through the overload indication message (or overload stop message). Likewise, the E2 node 1020 as well as the Near-RT RIC 1010 may notify the Near-RT RIC 1010 of the load status of the E2 node 1020. The transmission of the overload status may be configured with network entity (e.g., the Near-RT RIC 1010, the E2 node 1020), as well as RAN functions or units of RIC subscriptions. Thus, the overload reduction action may include an E2 removal procedure or a RIC subscription delete procedure. Based on the indication of the overload status described above and appropriate action for overload reduction, the load rate at each of the Near-RT RIC 1010 and the E2 node 1020 and the resource efficiency of the E2 interface may be increased.

The effects that may be obtained from the present disclosure are not limited to the effects mentioned above, other effects not mentioned may be clearly understood by those having ordinary knowledge in the technical field to which the present disclosure belongs from the following description.

According to embodiments, a method performed by an E2 node (e.g., first station) is provided. The method comprises identifying a load status of the E2 node. The method comprises transmitting, to a near-real time (Near-RT) radio access network (RAN) intelligent controller (RIC) (e.g., second station), a status indication message including overload information for indicating the load status of the E2 node. The overload information indicates whether the load status of the e2 node is overloaded or not-overloaded.

According to an embodiment, the overload information includes one or more RAN function identities (IDs). For each RAN function ID among the one or more RAN function IDs, the overload information comprises load information. The load information indicates whether a load status of a RAN function associated with a corresponding RAN function ID is overloaded or not overloaded in the E2 node.

According to an embodiment, the overload information includes one or more RIC request identities (IDs). For each RIC request ID among the one or more RIC request IDs, the overload information includes load information. The load information indicates whether a load status of a RIC subscription associated with a corresponding RIC request ID is overloaded or not overloaded in the E2 node.

According to an embodiment, the method comprises receiving, from the Near-RT RIC, an E2 removal request message. The method comprises transmitting, to the Near-RT RIC, an E2 removal response message.

According to an embodiment, the method comprises receiving, from the Near-RT RIC, a RIC subscription delete request message. The method comprises transmitting, to the Near-RT RIC, a RIC subscription delete response message. The RIC subscription delete request message includes subscription information corresponding to a RAN function ID or a RIC request ID included in the status indication message.

According to embodiments, a method performed by a near-real time (Near-RT) radio access network (RAN) intelligent controller (RIC) is provided. The method comprises receiving, from an E2 node, a status indication message including overload information. The method comprises identifying a load status of the E2 node based on the overload information. The overload information indicates whether the load status of the e2 node is overloaded or not-overloaded.

According to an embodiment, the overload information includes one or more RAN function identities (IDs). For each RAN function ID among the one or more RAN function IDs, the overload information comprises load information. The load information indicates whether a load status of a RAN function associated with a corresponding RAN function ID is overloaded or not overloaded in the E2 node.

According to an embodiment, the overload information includes one or more RIC request identities (IDs). For each RIC request ID among the one or more RIC request IDs, the overload information includes load information. The load information indicates whether a load status of a RIC subscription associated with a corresponding RIC request ID is overloaded or not overloaded in the E2 node.

According to an embodiment, the method comprises transmitting, to the E2 node, an E2 removal request message. The method comprises receiving, from the E2 node, an E2 removal response message.

According to an embodiment, the method comprises transmitting, to the E2 node, a RIC subscription delete request message, the method comprises receiving, from the E2 node, a RIC subscription delete response message. The RIC subscription delete request message includes subscription information corresponding to a RAN function ID or a RIC request ID included in the status indication message.

According to embodiments, a device of an E2 node is provided. The device comprises a memory configured to store instructions, at least one transceiver; and at least one processor. The instructions cause, when executed by the at least one processor, the device to identify a load status of the E2 node and control the at least one transceiver to transmit, to a near-real time (Near-RT) radio access network (RAN) intelligent controller (RIC), a status indication message including overload information for indicating the load status of the E2 node. The overload information indicates whether the load status of the E2 node is overloaded or not-overloaded.

According to an embodiment, the overload information includes one or more RAN function identities (IDs). For each RAN function ID among the one or more RAN function IDs, the overload information comprises load information. The load information indicates whether a load status of a RAN function associated with a corresponding RAN function ID is overloaded or not overloaded in the E2 node.

According to an embodiment, the overload information includes one or more RIC request identities (IDs). For each RIC request ID among the one or more RIC request IDs, the overload information includes load information. The load information indicates whether a load status of a RIC subscription associated with a corresponding RIC request ID is overloaded or not overloaded in the E2 node.

According to an embodiment, the instructions cause, when executed by the at least one processor, the device to control the at least one transceiver to receive, from the Near-RT RIC, an E2 removal request message and control the at least one transceiver to transmit, to the Near-RT RIC, an E2 removal response message.

According to an embodiment, the instructions cause, when executed by the at least one processor, the device to control the at least one transceiver to receive, from the Near-RT RIC, a RIC subscription delete request message and control the at least one transceiver to transmit, to the Near-RT RIC, a RIC subscription delete response message. The RIC subscription delete request message includes subscription information corresponding to a RAN function ID or a RIC request ID included in the status indication message.

According to embodiments, A device performed by a near-real time (Near-RT) radio access network (RAN) intelligent controller (RIC) is provided. The device comprises a memory configured to store instructions, at least one transceiver; and at least one processor. The instructions cause, when executed by the at least one processor, the device to control the at least one transceiver to receive, from an E2 node, a status indication message including overload information; and identify a load status of the E2 node based on the overload information. The overload information indicates whether the load status of the e2 node is overloaded or not-overloaded.

According to an embodiment, the overload information includes one or more RAN function identities (IDs). For each RAN function ID among the one or more RAN function IDs, the overload information comprises load information. The load information indicates whether a load status of a RAN function associated with a corresponding RAN function ID is overloaded or not overloaded in the E2 node.

According to an embodiment, the overload information includes one or more RIC request identities (IDs). For each RIC request ID among the one or more RIC request IDs, the overload information includes load information. The load information indicates whether a load status of a RIC subscription associated with a corresponding RIC request ID is overloaded or not overloaded in the E2 node.

According to an embodiment, the instructions cause, when executed by the at least one processor, the device to control the at least one transceiver to transmit, to the E2 node, an E2 removal request message and control the at least one transceiver to receive, from the E2 node, an E2 removal response message.

According to an embodiment, the instructions cause, when executed by the at least one processor, the device to control the at least one transceiver to transmit, to the E2 node, a RIC subscription delete request message and control the at least one transceiver to receive, from the E2 node, a RIC subscription delete response message. The RIC subscription delete request message includes subscription information corresponding to a RAN function ID or a RIC request ID included in the status indication message.

According to embodiments, a method performed by an E2 node is provided. The method comprises receiving, from a near-real time (Near-RT) radio access network (RAN) intelligent controller (RIC), a first message for indicating that load status of the Near-RT RIC is overloaded. The method comprises waiting for signaling on E2 interface until receiving a second message indicating that the load status of the Near-RT RIC is not overloaded, based on the first message. The method comprises receiving, from the Near-RT RIC, the second message. The method comprises performing the signaling on the E2 interface after receiving the second message.

According to an embodiment, the first message comprises a RIC overload start message. The first message includes one or more RAN function identities (IDs). The first message, for each RAN function ID among the one or more RAN function IDs, comprises load information. The load information indicates whether a load status of a RAN function associated with a corresponding RAN function ID is overloaded or not overloaded in the Near-RT RIC. The second message comprises a RIC overload stop message. The second message includes at least one RAN function ID corresponding to at least one RAN function stopped by the first message.

According to an embodiment, the first message comprises a RIC overload start message. The first message includes one or more RIC request identities (IDs). The first message, for each RIC request ID among the one or more RIC request IDs, comprises load information. The load information indicates whether a load status of a RIC subscription associated with a corresponding RIC request ID is overloaded or not overloaded in the Near-RT RIC. The second message comprises a RIC overload stop message. The second message includes at least one RIC request ID corresponding to at least one RIC subscription stopped by the first message.

According to an embodiment, each of the first message and the second message comprises a RIC overload indication message including overload information. The first message comprises the RIC overload indication message set to indicate that the overload information is overloaded. The second message comprises the RIC overload indication message set to indicate that the overload information is not overloaded.

According to an embodiment, the method comprises receiving, from the Near-RT RIC, a RIC subscription delete request message. The method comprises transmitting, to the Near-RT RIC, a RIC subscription delete response message. The RIC subscription delete request message includes subscription information corresponding to a RAN function ID or a RIC request ID included in the first message.

According to embodiments, a method performed by a near-real time (Near-RT) radio access network (RAN) intelligent controller (RIC) is provided. The method comprises transmitting, to an E2 node, a first message for indicating that load status of the Near-RT RIC is overloaded. The method comprises transmitting, to the E2 node, a second message indicating that the load status of the Near-RT RIC is not overloaded. The first message configures the E2 node to wait for signaling on E2 interface until receiving the second message.

According to an embodiment, the first message comprises a RIC overload start message. The first message includes one or more RAN function identities (IDs). The first message, for each RAN function ID among the one or more RAN function IDs, comprises load information. The load information indicates whether a load status of a RAN function associated with a corresponding RAN function ID is overloaded or not overloaded in the Near-RT RIC. The second message comprises a RIC overload stop message. The second message includes at least one RAN function ID corresponding to at least one RAN function stopped by the first message.

According to an embodiment, the first message comprises a RIC overload start message. The first message includes one or more RIC request identities (IDs). The first message, for each RIC request ID among the one or more RIC request IDs, comprises load information. The load information indicates whether a load status of a RIC subscription associated with a corresponding RIC request ID is overloaded or not overloaded in the Near-RT RIC. The second message comprises a RIC overload stop message. The second message includes at least one RIC request ID corresponding to at least one RIC subscription stopped by the first message.

According to an embodiment, each of the first message and the second message comprises a RIC overload indication message including overload information. The first message comprises the RIC overload indication message set to indicate that the overload information is overloaded. The second message comprises the RIC overload indication message set to indicate that the overload information is not overloaded.

According to an embodiment, the method comprises transmitting, to the E2 node, a RIC subscription delete request message. The method comprises receiving, from the E2 node, a RIC subscription delete response message. The RIC subscription delete request message includes subscription information corresponding to a RAN function ID or a RIC request ID included in the first message.

According to embodiments, A device performed by an E2 node is provided. The device comprises a memory configured to store instructions, at least one transceiver; and at least one processor. The instructions cause, when executed by the at least one processor, the device to control the at least one transceiver to receive, from a near-real time (Near-RT) radio access network (RAN) intelligent controller (RIC), a first message for indicating that load status of the Near-RT RIC is overloaded, wait for signaling on E2 interface until receiving a second message indicating that the load status of the Near-RT RIC is not overloaded, based on the first message, control the at least one transceiver to receive, from the Near-RT RIC, the second message, and perform the signaling on the E2 interface after receiving the second message.

According to an embodiment, the first message comprises a RIC overload start message. The first message includes one or more RAN function identities (IDs). The first message, for each RAN function ID among the one or more RAN function IDs, comprises load information. The load information indicates whether a load status of a RAN function associated with a corresponding RAN function ID is overloaded or not overloaded in the Near-RT RIC. The second message comprises a RIC overload stop message. The second message includes at least one RAN function ID corresponding to at least one RAN function stopped by the first message.

According to an embodiment, the first message comprises a RIC overload start message. The first message includes one or more RIC request identities (IDs). The first message, for each RIC request ID among the one or more RIC request IDs, comprises load information. The load information indicates whether a load status of a RIC subscription associated with a corresponding RIC request ID is overloaded or not overloaded in the Near-RT RIC. The second message comprises a RIC overload stop message. The second message includes at least one RIC request ID corresponding to at least one RIC subscription stopped by the first message.

According to an embodiment, each of the first message and the second message comprises a RIC overload indication message including overload information. The first message comprises the RIC overload indication message set to indicate that the overload information is overloaded. The second message comprises the RIC overload indication message set to indicate that the overload information is not overloaded.

According to an embodiment, the instructions cause, when executed by the at least one processor, the device to control the at least one transceiver to receive, from the Near-RT RIC, a RIC subscription delete request message and control the at least one transceiver to transmit, to the Near-RT RIC, a RIC subscription delete response message. The RIC subscription delete request message includes subscription information corresponding to a RAN function ID or a RIC request ID included in the first message.

According to embodiments, A device of a near-real time (Near-RT) radio access network (RAN) intelligent controller (RIC), the device comprises a memory configured to store instructions, at least one transceiver, and at least one processor. The instructions cause, when executed by the at least one processor, the device to control the at least one transceiver to transmit, to an E2 node, a first message for indicating that load status of the Near-RT RIC is overloaded and control the at least one transceiver to transmit, to the E2 node, a second message indicating that the load status of the Near-RT RIC is not overloaded. The first message configures the E2 node to wait for signaling on E2 interface until receiving the second message.

According to an embodiment, the first message comprises a RIC overload start message. The first message includes one or more RAN function identities (IDs). The first message, for each RAN function ID among the one or more RAN function IDs, comprises load information. The load information indicates whether a load status of a RAN function associated with a corresponding RAN function ID is overloaded or not overloaded in the Near-RT RIC. The second message comprises a RIC overload stop message. The second message includes at least one RAN function ID corresponding to at least one RAN function stopped by the first message.

According to an embodiment, the first message comprises a RIC overload start message. The first message includes one or more RIC request identities (IDs). The first message, for each RIC request ID among the one or more RIC request IDs, comprises load information. The load information indicates whether a load status of a RIC subscription associated with a corresponding RIC request ID is overloaded or not overloaded in the Near-RT RIC. The second message comprises a RIC overload stop message. The second message includes at least one RIC request ID corresponding to at least one RIC subscription stopped by the first message.

According to an embodiment, each of the first message and the second message comprises a RIC overload indication message including overload information. The first message comprises the RIC overload indication message set to indicate that the overload information is overloaded. The second message comprises the RIC overload indication message set to indicate that the overload information is not overloaded.

According to an embodiment, the instructions cause, when executed by the at least one processor, the device to control the at least one transceiver to receive transmit, to the E2 node, a RIC subscription delete request message and control the at least one transceiver to receive, from the E2 node, a RIC subscription delete response message. The RIC subscription delete request message includes subscription information corresponding to a RAN function ID or a RIC request ID included in the first message.

In embodiments, a method performed by an E2 node is provided. The method comprises receiving, from a near-real time (Near-RT) radio access network (RAN) intelligent controller (RIC), a first message indicating that load status for a RAN function or a RIC subscription associated with the RAN function is overloaded in the Near-RT RIC; based on the first message, suspend a procedure related to the RAN function or the RIC subscription until receiving a second message indicating that the load status for the RAN function or the RIC subscription associated with the RAN function is not overloaded in the Near-RT RIC; receiving, from the Near-RT RIC, the second message; and based on the second message, resuming the procedure related to the RAN function or the RIC subscription.

For example, the method comprises receiving, from the Near-RT RIC, a RIC subscription delete request message to delete to another RIC subscription configured between the E2 interface and Near-RT RIC after receiving the first message indicating that the load status is overloaded; and transmitting, to the Near-RT RIC, a RIC subscription delete response message in response to the RIC subscription delete request message. The RIC subscription delete request message includes a RIC request ID corresponding to the other RIC subscription.

For example, the first message includes action information indicating at least one action related to the RAN function and probability information. The probability information indicates a stop ratio for signaling traffic related to the action information.

For example, the first message includes a message type, a transaction ID, a RAN function ID corresponding to the RAN function, a RIC request ID corresponding to the RIC subscription, and overload information for indicating that the load status for the RAN function or the RIC subscription is overloaded in the Near-RT RIC. The second message includes the message type, the transaction ID, the RAN function ID or the RIC request ID indicated by the first message. The RAN function ID or the RIC request ID in the second message indicates that the load status for the RAN function or the RIC subscription associated with the RAN function is not overloaded in the Near-RT RIC.

For example, each of the first message and the second message includes a RIC overload indication message having a format using overload information. The first message corresponds to the RIC overload indication message of which the overload information is set as being overloaded. The second message corresponds to the RIC overload indication message of which the overload information is set as being not-overloaded.

In embodiments, a method performed by a near-real time (Near-RT) radio access network (RAN) intelligent controller (RIC) is provided. The method comprises transmitting, to a E2 node, a first message indicating that load status for a RAN function or a RIC subscription associated with the RAN function is overloaded in the Near-RT RIC; and transmitting, to the E2 node, a second message indicating that the load status is not overloaded in the Near-RT RIC. The first message cause the E2 node to suspend a procedure related to the RAN function or the RIC subscription until receiving the second message. The second message causes the E2 node to resume the procedure related to the RAN function or the RIC subscription.

For example, the method comprises transmitting, to the E2 node, a RIC subscription delete request message to delete to another RIC subscription configured between the E2 interface and Near-RT RIC after receiving the first message indicating that the load status is overloaded; and receiving, from the E2 node, a RIC subscription delete response message in response to the RIC subscription delete request message. The RIC subscription delete request message includes a RIC request ID corresponding to the other RIC subscription.

For example, the first message includes action information indicating at least one action related to the RAN function and probability information. The probability information indicates a stop ratio for signaling traffic related to the action information.

For example, the first message includes a message type, a transaction ID, a RAN function ID corresponding to the RAN function, a RIC request ID corresponding to the RIC subscription, and overload information for indicating that the load status for the RAN function or the RIC subscription is overloaded in the Near-RT RIC. The second message includes the message type, the transaction ID, the RAN function ID or the RIC request ID indicated by the first message. The RAN function ID or the RIC request ID in the second message indicates that the load status for the RAN function or the RIC subscription associated with the RAN function is not overloaded in the Near-RT RIC.

For example, each of the first message and the second message includes a RIC overload indication message having a format using overload information. The first message corresponds to the RIC overload indication message of which the overload information is set as being overloaded. The second message corresponds to the RIC overload indication message of which the overload information is set as being not-overloaded.

In embodiments, a device of an E2 node is provided. The device comprises memory storing instructions, at least one transceiver, and a processor. The instructions cause, when executed by the processor, the device to control the at least one transceiver to receive, from a near-real time (Near-RT) radio access network (RAN) intelligent controller (RIC), a first message indicating that load status for a RAN function or a RIC subscription associated with the RAN function is overloaded in the Near-RT RIC, based on the first message, suspend a procedure related to the RAN function or the RIC subscription until receiving a second message indicating that the load status for the RAN function or the RIC subscription associated with the RAN function is not overloaded in the Near-RT RIC, control the at least one transceiver to receive, from the Near-RT RIC, the second message, and based on the second message, resume the procedure related to the RAN function or the RIC subscription.

For example, the instructions cause, when executed by the processor, the device to control the at least one transceiver to receive, from the Near-RT RIC, a RIC subscription delete request message to delete to another RIC subscription configured between the E2 interface and Near-RT RIC after receiving the first message indicating that the load status is overloaded; and control the at least one transceiver to transmit, to the Near-RT RIC, a RIC subscription delete response message in response to the RIC subscription delete request message. The RIC subscription delete request message includes a RIC request ID corresponding to the other RIC subscription.

For example, the first message includes action information indicating at least one action related to the RAN function and probability information. The probability information indicates a stop ratio for signaling traffic related to the action information.

For example, the first message includes a message type, a transaction ID, a RAN function ID corresponding to the RAN function, a RIC request ID corresponding to the RIC subscription, and overload information for indicating that the load status for the RAN function or the RIC subscription is overloaded in the Near-RT RIC. The second message includes the message type, the transaction ID, the RAN function ID or the RIC request ID indicated by the first message. The RAN function ID or the RIC request ID in the second message indicates that the load status for the RAN function or the RIC subscription associated with the RAN function is not overloaded in the Near-RT RIC.

For example, each of the first message and the second message includes a RIC overload indication message having a format using overload information. The first message corresponds to the RIC overload indication message of which the overload information is set as being overloaded. The second message corresponds to the RIC overload indication message of which the overload information is set as being not-overloaded.

In embodiments, a device of a near-real time (Near-RT) radio access network (RAN) intelligent controller (RIC) is provided. The device comprises memory storing instructions, at least one transceiver; and a processor, The instructions cause, when executed by the processor, the device to control the at least one transceiver to transmit, to a E2 node, a first message indicating that load status for a RAN function or a RIC subscription associated with the RAN function is overloaded in the Near-RT RIC; and control the at least one transceiver to transmit, to the E2 node, a second message indicating that the load status is not overloaded in the Near-RT RIC. The first message causes the E2 node to suspend a procedure related to the RAN function or the RIC subscription until receiving the second message. The second message causes the E2 node to resume the procedure related to the RAN function or the RIC subscription.

For example, the instructions cause, when executed by the processor, the device to control the at least one transceiver to transmit, to the E2 node, a RIC subscription delete request message to delete to another RIC subscription configured between the E2 interface and Near-RT RIC after receiving the first message indicating that the load status is overloaded; and control the at least one transceiver to receive, from the E2 node, a RIC subscription delete response message in response to the RIC subscription delete request message. The RIC subscription delete request message includes a RIC request ID corresponding to the other RIC subscription.

For example, the first message includes action information indicating at least one action related to the RAN function and probability information. The probability information indicates a stop ratio for signaling traffic related to the action information.

For example, the first message includes a message type, a transaction ID, a RAN function ID corresponding to the RAN function, a RIC request ID corresponding to the RIC subscription, and overload information for indicating that the load status for the RAN function or the RIC subscription is overloaded in the Near-RT RIC. The second message includes the message type, the transaction ID, the RAN function ID or the RIC request ID indicated by the first message. The RAN function ID or the RIC request ID in the second message indicates that the load status for the RAN function or the RIC subscription associated with the RAN function is not overloaded in the Near-RT RIC.

For example, each of the first message and the second message includes a RIC overload indication message having a format using overload information. The first message corresponds to the RIC overload indication message of which the overload information is set as being overloaded.

The second message corresponds to the RIC overload indication message of which the overload information is set as being not-overloaded.

In embodiments, a non-transitory computer-readable storage medium is provided. The non-transitory computer-readable storage medium comprises memory storing instructions. The instructions cause, when executed by a processor, an E2 node to receive, from a near-real time (Near-RT) radio access network (RAN) intelligent controller (RIC), a first message indicating that load status for a RAN function or a RIC subscription associated with the RAN function is overloaded in the Near-RT RIC, based on the first message, suspend a procedure related to the RAN function or the RIC subscription until receiving a second message indicating that the load status for the RAN function or the RIC subscription associated with the RAN function is not overloaded in the Near-RT RIC, receive, from the Near-RT RIC, the second message, and based on the second message, resume the procedure related to the RAN function or the RIC subscription.

In embodiments, a non-transitory computer-readable storage medium is provided. The non-transitory computer-readable storage medium comprises memory storing instructions. The instructions cause, when executed by a processor, a near-real time (Near-RT) radio access network (RAN) intelligent controller (RIC) to transmit, to a E2 node, a first message indicating that load status for a RAN function or a RIC subscription associated with the RAN function is overloaded in the Near-RT RIC; and transmit, to the E2 node, a second message indicating that the load status is not overloaded in the Near-RT RIC. The first message causes the E2 node to suspend a procedure related to the RAN function or the RIC subscription until receiving the second message. The second message causes the E2 node to resume the procedure related to the RAN function or the RIC subscription.

Methods according to the embodiments described in the claims or the specification of the present disclosure may be implemented in the form of hardware, software, or a combination of hardware and software.

When implemented as software, a computer-readable storage medium storing one or more program (software module) may be provided. The one or more program stored in the computer-readable storage medium is configured for execution by one or more processor in the electronic device. The one or more program include instructions that cause the electronic device to execute methods according to embodiments described in the claim or the specification of the present disclosure.

Such program (software modules, software) may be stored in random access memory, non-volatile memory including flash memory, read only memory (ROM), electrically erasable programmable read only memory (EE-PROM), magnetic disc storage device, compact disc-ROM (CD-ROM), digital versatile disc (DVD) or other form of optical storage, magnetic cassette. Alternatively, it may be stored in a memory configured with some or all combinations thereof. In addition, each configuration memory may be included a plurality.

In addition, the program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the present disclosure through an external port. In addition, a separate storage device on the communication network may access a device performing an embodiment of the present disclosure.

In the above-described specific embodiments of the present disclosure, the component included in the disclosure is expressed in singular or plural according to the presented specific embodiment. However, singular or plural expression is chosen appropriately for the situation presented for convenience of explanation, and the present disclosure is not limited to singular or plural component, and even if the component is expressed in plural, it may be configured with singular, or even if it is expressed in singular, it may be configured with plural.

In the detailed description of the present disclosure, the specific embodiment have been described, but it goes without saying that various modification is possible within the limit not departing from the scope of the present disclosure.

What is claimed is:

1. A method performed by an E2 node, the method comprising:

receiving, from a near-real time (Near-RT) radio access network (RAN) intelligent controller (RIC), a first message indicating that load status for a RAN function or a RIC subscription associated with the RAN function is overloaded in the Near-RT RIC;

based on the first message, suspend a procedure related to the RAN function or the RIC subscription until receiving a second message indicating that the load status for the RAN function or the RIC subscription associated with the RAN function is not overloaded in the Near-RT RIC;

receiving, from the Near-RT RIC, the second message; and based on the second message, resuming the procedure related to the RAN function or the RIC subscription.

2. The method of claim 1, further comprising:

receiving, from the Near-RT RIC, a RIC subscription delete request message to delete to another RIC subscription configured between the E2 interface and Near-RT RIC after receiving the first message indicating that the load status is overloaded; and transmitting, to the Near-RT RIC, a RIC subscription delete response message in response to the RIC subscription delete request message, and wherein the RIC subscription delete request message includes a RIC request ID corresponding to the other RIC subscription.

3. The method of claim 1, wherein the first message includes action information indicating at least one action related to the RAN function and probability information, and wherein the probability information indicates a stop ratio for signaling traffic related to the action information.

4. The method of claim 1, wherein the first message includes:

a message type,
a transaction ID,
a RAN function ID corresponding to the RAN function,
a RIC request ID corresponding to the RIC subscription, and
overload information for indicating that the load status for the RAN function or the RIC subscription is overloaded in the Near-RT RIC,

wherein the second message includes:

the message type,
the transaction ID,
the RAN function ID or the RIC request ID indicated by the first message, and wherein the RAN function ID or the RIC request ID in the second message indicates that the load status for the RAN function or the RIC subscription associated with the RAN function is not overloaded in the Near-RT RIC.

5. The method of claim 1, wherein each of the first message and the second message includes a RIC overload indication message having a format using overload information, wherein the first message corresponds to the RIC overload indication message of which the overload information is set as being overloaded, and wherein the second message corresponds to the RIC overload indication message of which the overload information is set as being not-overloaded.

6. A method performed by a near-real time (Near-RT) radio access network (RAN) intelligent controller (RIC), the method comprising:

transmitting, to a E2 node, a first message indicating that load status for a RAN function or a RIC subscription associated with the RAN function is overloaded in the Near-RT RIC; and transmitting, to the E2 node, a second message indicating that the load status is not overloaded in the Near-RT RIC, wherein the first message cause the E2 node to suspend a procedure related to the RAN function or the RIC subscription until receiving the second message, and wherein the second message causes the E2 node to resume the procedure related to the RAN function or the RIC subscription.

7. The method of claim 6, further comprising:

transmitting, to the E2 node, a RIC subscription delete request message to delete to another RIC subscription configured between the E2 interface and Near-RT RIC after receiving the first message indicating that the load status is overloaded; and receiving, from the E2 node, a RIC subscription delete response message in response to the RIC subscription delete request message, wherein the RIC subscription delete request message includes a RIC request ID corresponding to the other RIC subscription.

8. The method of claim 6, wherein the first message includes action information indicating at least one action related to the RAN function and probability information, and wherein the probability information indicates a stop ratio for signaling traffic related to the action information.

9. The method of claim 6, wherein the first message includes:

a message type,
a transaction ID,
a RAN function ID corresponding to the RAN function,
a RIC request ID corresponding to the RIC subscription, and
overload information for indicating that the load status for the RAN function or the RIC subscription is overloaded in the Near-RT RIC,

wherein the second message includes:
  the message type,
  the transaction ID,
  the RAN function ID or the RIC request ID indicated by the first message, and
  wherein the RAN function ID or the RIC request ID in the second message indicates that the load status for the RAN function or the RIC subscription associated with the RAN function is not overloaded in the Near-RT RIC.

10. The method of claim 6, wherein each of the first message and the second message includes a RIC overload indication message having a format using overload information,
  wherein the first message corresponds to the RIC overload indication message of which the overload information is set as being overloaded, and
  wherein the second message corresponds to the RIC overload indication message of which the overload information is set as being not-overloaded.

11. A device of an E2 node, the device comprising:
  memory storing instructions,
  at least one transceiver; and
  a processor,
  wherein the instructions cause, when executed by the processor, the device to:
  control the at least one transceiver to receive, from a near-real time (Near-RT) radio access network (RAN) intelligent controller (RIC), a first message indicating that load status for a RAN function or a RIC subscription associated with the RAN function is overloaded in the Near-RT RIC;
  based on the first message, suspend a procedure related to the RAN function or the RIC subscription until receiving a second message indicating that the load status for the RAN function or the RIC subscription associated with the RAN function is not overloaded in the Near-RT RIC;
  control the at least one transceiver to receive, from the Near-RT RIC, the second message; and
  based on the second message, resume the procedure related to the RAN function or the RIC subscription.

12. The device of claim 11, wherein, the instructions cause, when executed by the processor, the device to:
  control the at least one transceiver to receive, from the Near-RT RIC, a RIC subscription delete request message to delete to another RIC subscription configured between the E2 interface and Near-RT RIC after receiving the first message indicating that the load status is overloaded; and
  control the at least one transceiver to transmit, to the Near-RT RIC, a RIC subscription delete response message in response to the RIC subscription delete request message, and
  wherein the RIC subscription delete request message includes a RIC request ID corresponding to the other RIC subscription.

13. The device of claim 11, wherein the first message includes action information indicating at least one action related to the RAN function and probability information, and
  wherein the probability information indicates a stop ratio for signaling traffic related to the action information.

14. The device of claim 11, wherein the first message includes:
  a message type,
  a transaction ID,
  a RAN function ID corresponding to the RAN function,
  a RIC request ID corresponding to the RIC subscription, and
  overload information for indicating that the load status for the RAN function or the RIC subscription is overloaded in the Near-RT RIC,
  wherein the second message includes:
  the message type,
  the transaction ID,
  the RAN function ID or the RIC request ID indicated by the first message, and
  wherein the RAN function ID or the RIC request ID in the second message indicates that the load status for the RAN function or the RIC subscription associated with the RAN function is not overloaded in the Near-RT RIC.

15. The device of claim 11, wherein each of the first message and the second message includes a RIC overload indication message having a format using overload information,
  wherein the first message corresponds to the RIC overload indication message of which the overload information is set as being overloaded, and
  wherein the second message corresponds to the RIC overload indication message of which the overload information is set as being not-overloaded.

16. A device of a near-real time (Near-RT) radio access network (RAN) intelligent controller (RIC), the device comprising:
  memory storing instructions,
  at least one transceiver; and
  a processor,
  wherein the instructions cause, when executed by the processor, the device to:
  control the at least one transceiver to transmit, to a E2 node, a first message indicating that load status for a RAN function or a RIC subscription associated with the RAN function is overloaded in the Near-RT RIC; and
  control the at least one transceiver to transmit, to the E2 node, a second message indicating that the load status is not overloaded in the Near-RT RIC,
  wherein the first message causes the E2 node to suspend a procedure related to the RAN function or the RIC subscription until receiving the second message, and
  wherein the second message causes the E2 node to resume the procedure related to the RAN function or the RIC subscription.

17. The device of claim 16, wherein, the instructions cause, when executed by the processor, the device to:
  control the at least one transceiver to transmit, to the E2 node, a RIC subscription delete request message to delete to another RIC subscription configured between the E2 interface and Near-RT RIC after receiving the first message indicating that the load status is overloaded; and
  control the at least one transceiver to receive, from the E2 node, a RIC subscription delete response message in response to the RIC subscription delete request message, and
  wherein the RIC subscription delete request message includes a RIC request ID corresponding to the other RIC subscription.

18. The device of claim 16, wherein the first message includes action information indicating at least one action related to the RAN function and probability information, and wherein the probability information indicates a stop ratio for signaling traffic related to the action information.

19. The device of claim 16, wherein the first message includes:

a message type, a transaction ID, a RAN function ID corresponding to the RAN function, a RIC request ID corresponding to the RIC subscription, and overload information for indicating that the load status for the RAN function or the RIC subscription is overloaded in the Near-RT RIC, wherein the second message includes:

the message type, the transaction ID, the RAN function ID or the RIC request ID indicated by the first message, and wherein the RAN function ID or the RIC request ID in the second message indicates that the load status for the RAN function or the RIC subscription associated with the RAN function is not overloaded in the Near-RT RIC.

20. The device of claim 16, wherein each of the first message and the second message includes a RIC overload indication message having a format using overload information, wherein the first message corresponds to the RIC overload indication message of which the overload information is set as being overloaded, and wherein the second message corresponds to the RIC overload indication message of which the overload information is set as being not-overloaded.

21. A non-transitory computer-readable storage medium comprising:

memory storing instructions, wherein the instructions cause, when executed by a processor, an E2 node to:

receive, from a near-real time (Near-RT) radio access network (RAN) intelligent controller (RIC), a first message indicating that load status for a RAN function or a RIC subscription associated with the RAN function is overloaded in the Near-RT RIC, based on the first message, suspend a procedure related to the RAN function or the RIC subscription until receiving a second message indicating that the load status for the RAN function or the RIC subscription associated with the RAN function is not overloaded in the Near-RT RIC, receive, from the Near-RT RIC, the second message, and based on the second message, resume the procedure related to the RAN function or the RIC subscription.

22. A non-transitory computer-readable storage medium comprising:

memory storing instructions, wherein the instructions cause, when executed by a processor, a near-real time (Near-RT) radio access network (RAN) intelligent controller (RIC) to:

transmit, to a E2 node, a first message indicating that load status for a RAN function or a RIC subscription associated with the RAN function is overloaded in the Near-RT RIC; and transmit, to the E2 node, a second message indicating that the load status is not overloaded in the Near-RT RIC, wherein the first message causes the E2 node to suspend a procedure related to the RAN function or the RIC subscription until receiving the second message, and wherein the second message causes the E2 node to resume the procedure related to the RAN function or the RIC subscription.

\* \* \* \* \*